US012613560B2

(12) United States Patent
Lee et al.

(10) Patent No.: US 12,613,560 B2
(45) Date of Patent: Apr. 28, 2026

(54) ELECTRONIC APPARATUS INCLUDING MICROPHONE AND CONTROL METHOD THEREFOR

(71) Applicant: SAMSUNG ELECTRONICS CO., LTD., Suwon-si (KR)

(72) Inventors: Hyojin Lee, Suwon-si (KR); Kyumin Kim, Suwon-si (KR); Injune Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 481 days.

(21) Appl. No.: 18/295,458

(22) Filed: Apr. 4, 2023

(65) Prior Publication Data

US 2023/0236639 A1 Jul. 27, 2023

Related U.S. Application Data

(63) Continuation of application No. PCT/KR2021/014697, filed on Oct. 20, 2021.

(30) Foreign Application Priority Data

Dec. 2, 2020 (KR) ........................ 10-2020-0166523
Feb. 15, 2021 (KR) ........................ 10-2021-0019791

(51) Int. Cl.
*G06F 1/16* (2006.01)
*G01H 17/00* (2006.01)
(Continued)

(52) U.S. Cl.
CPC ........... *G06F 1/1677* (2013.01); *G01H 17/00* (2013.01); *G10K 11/17823* (2018.01); *G01P 15/00* (2013.01)

(58) Field of Classification Search
CPC . G06F 1/1677; G01H 17/00; G10K 11/17823
See application file for complete search history.

(56) References Cited

U.S. PATENT DOCUMENTS

2010/0056227 A1 3/2010 Hayakawa et al.
2012/0099830 A1 4/2012 Shibuno
(Continued)

FOREIGN PATENT DOCUMENTS

EP 0 689 332 A2 12/1995
EP 2 993 876 A1 3/2016
(Continued)

OTHER PUBLICATIONS

International Search Report for PCT/KR2021/014697 mailed Jan. 11, 2022, 5 pages.
(Continued)

*Primary Examiner* — Myron Wyche
(74) *Attorney, Agent, or Firm* — Nixon & Vanderhye, P.C.

(57) ABSTRACT

An electronic device includes a first housing, a second housing connected to at least a portion of the first housing and movable with respect to the first housing, at least one display coupled with at least one of the first housing or the second housing, at least one microphone, at least one sensor and at least one processor. The at least one processor is configured to: obtain first audio data using the at least one microphone; identify that a form of the electronic device is changed according to relative movement of the first housing and the second housing, using the at least one sensor while the first audio data is obtained, identify noise data based on identifying that the form of the electronic device is changed, and obtain second audio data from the first audio data based on the identified noise data. The second audio data may include data in which at least a portion of noise, which is (Continued)

generated based on a change of the form of the electronic device and included in the first audio data, is reduced.

20 Claims, 17 Drawing Sheets

(51) Int. Cl.
    *G10K 11/178*        (2006.01)
    *G01P 15/00*        (2006.01)

(56)               References Cited

U.S. PATENT DOCUMENTS

| | | |
|---|---|---|
| 2012/0133784 A1 | 5/2012 | Kajimura |
| 2012/0288112 A1 | 11/2012 | Yang |
| 2014/0369516 A1 | 12/2014 | Rhee |
| 2015/0022434 A1 | 1/2015 | Matas |
| 2015/0116519 A1 | 4/2015 | Jarske et al. |
| 2015/0172572 A1 | 6/2015 | Kim |
| 2017/0154609 A1 | 6/2017 | Yoon et al. |
| 2017/0287460 A1 | 10/2017 | Stewart et al. |
| 2018/0102123 A1 | 4/2018 | Tisch et al. |

FOREIGN PATENT DOCUMENTS

| | | | |
|---|---|---|---|
| JP | 2000069127 A | 3/2000 | |
| KR | 20060023235 A | 3/2006 | |
| KR | 100798623 B1 | 1/2008 | |
| KR | 20100025463 A | 3/2010 | |
| KR | 20100025638 A | 3/2010 | |
| KR | 20100034288 A | 4/2010 | |
| KR | 20110049032 A | 5/2011 | |
| KR | 20140145401 A | 12/2014 | |
| KR | 20170062327 A | 6/2017 | |
| WO | WO2018214296 | * 11/2018 | ............... H04R 3/04 |

OTHER PUBLICATIONS

Written Opinion of the ISA for PCT/KR2021/014697 mailed Jan. 11, 2022, 4 pages.

Office Action dated Aug. 13, 2025 in Korean Application No. 10-2021-0019791 and English-language translation.

Extended Search Report dated Feb. 12, 2024 in EP Application No. 21900803.4.

Communication pursuant to Article 94(3) EPC dated Oct. 18, 2024 in European Patent Application No. 21900803.4.

Communication pursuant to Article 94(3) EPC dated Mar. 17, 2025 in European Patent Application No. 21900803.4.

* cited by examiner

501    Step 1    503       501    Step 2    503

:

501    Step (n-1)    503

501    Step n    503

ELECTRONIC APPARATUS INCLUDING MICROPHONE AND CONTROL METHOD THEREFOR

CROSS-REFERENCE TO RELATED APPLICATIONS

This application is a continuation of International Patent Application No. PCT/KR2021/014697 designating the United States, filed on Oct. 20, 2021, in the Korean Intellectual Property Receiving Office and claiming priority to Korean Patent Application No. 10-2020-0166523, filed on Dec. 2, 2020, in the Korean Intellectual Property Office, and to Korean Patent Application No. 10-2021-0019791, filed on Feb. 15, 2021, in the Korean Intellectual Property Office. The disclosures of each of these applications are incorporated by reference herein in their entireties.

BACKGROUND

Field

The disclosure relates to electronic devices including a microphone and methods for controlling the same.

Description of Related Art

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

SUMMARY

An electronic device may detect external voice using a microphone, convert the detected external voice into data, and provide the data of the external voice (hereinafter, audio data) to an application. For example, the electronic device may provide audio data to various applications, such as a recording application and a call application, thereby providing various functions to the user.

When the electronic device detects an external voice, not only the voice desired by the user but also noise around the electronic device may be detected. For this reason, the audio data provided to the application may also include noise not desired by the user.

In the past, portable electronic devices were typically provided in a non-transformable bar-type form, but transformable portable electronic devices, such as of a foldable type, rollable type, swivel type, or slidable type, have recently been developed and released. Such transformable portable electronic devices may have, e.g., a display that is folded, unfolded, or rolled and, when the form is transformed, noise (e.g., mechanical impact sound) may be caused due to impact between the structures (e.g., the housings forming the outer surface of the electronic device). Further, the transformable portable electronic device includes a spring in, e.g., the folded or unfolded portion (e.g., hinge) and is configured to be transformable automatically or semi-automatically. If the electronic device is transformed, e.g., while the user takes video using the portable electronic device, the noise (e.g., mechanical impact sound)

caused when the electronic device is transformed may also be detected (e.g., recorded) and be included in the audio data and then provided to the application.

According to various example embodiments, an electronic device may be provided for performing processing for reducing (or removing) noise for obtained audio data if a change of a form of the electronic device is detected and a method for controlling the same.

According to an embodiment, an electronic device may include a first housing, a second housing connected with at least a portion of the first housing and movable with respect to the first housing, at least one display coupled with at least one of the first housing or the second housing, at least one microphone, at least one sensor, and at least one processor. The at least one processor may be configured to obtain first audio data, using the at least one microphone, identify that a form of the electronic device is changed according to a relative movement of the first housing and the second housing, using the at least one sensor, while the first audio data is obtained, identify noise data based on identifying that the form of the electronic device is changed, and obtain second audio data from the first audio data, based on the identified noise data. The second audio data may include data in which at least a portion of noise, which is generated based on a change of the form of the electronic device and included in the first audio data, is reduced.

According to an embodiment, a method for controlling an electronic device may include obtaining first audio data, using at least one microphone of the electronic device, identifying that a form of the electronic device is changed according to a relative movement of a first housing of the electronic device and a second housing of the electronic device, using at least one sensor of the electronic device, while the first audio data is obtained, identifying noise data based on identifying that the form of the electronic device is changed, and obtaining second audio data from the first audio data, based on the identified noise data. The second audio data may include data in which at least a portion of noise, which is generated based on a change of the form of the electronic device and included in the first audio data, is reduced.

According to an embodiment, a non-transitory computer-readable non-volatile recording medium may store instructions that, when executed, enable at least one processor to obtain first audio data, using at least one microphone of the electronic device, identify that a form of the electronic device is changed according to a relative movement of a first housing of the electronic device and a second housing of the electronic device, using at least one sensor of the electronic device, while the first audio data is obtained, identify noise data based on identifying that the form of the electronic device is changed, and obtain second audio data from the first audio data, based on the identified noise data. The second audio data may include data in which at least a portion of noise, which is generated based on a change of the form of the electronic device and included in the first audio data, is reduced.

According to an embodiment, the electronic device may provide noise-reduced audio data to an application when a form of the electronic device is changed.

According to an embodiment, the electronic device may identify the noise pattern expected to be caused when a form of the electronic device is changed, providing noise-reduced audio data to the application.

Various effects achievable according to the disclosure are not limited to the foregoing effects.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
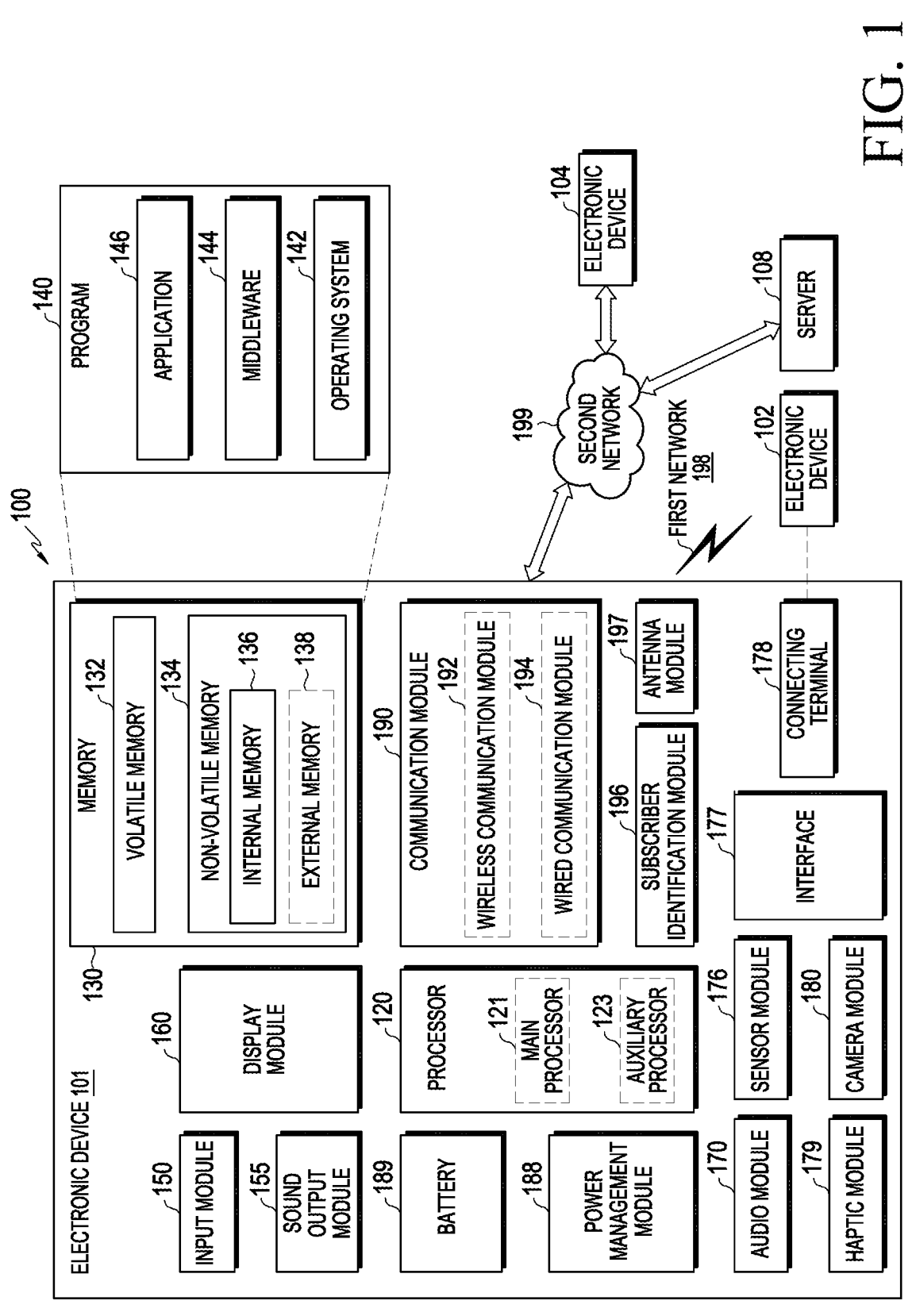
FIG. 1 is a diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)).

These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of or including a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, parts (e.g., radio frequency integrated circuit (RFIC)) other than the radiator may be further formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
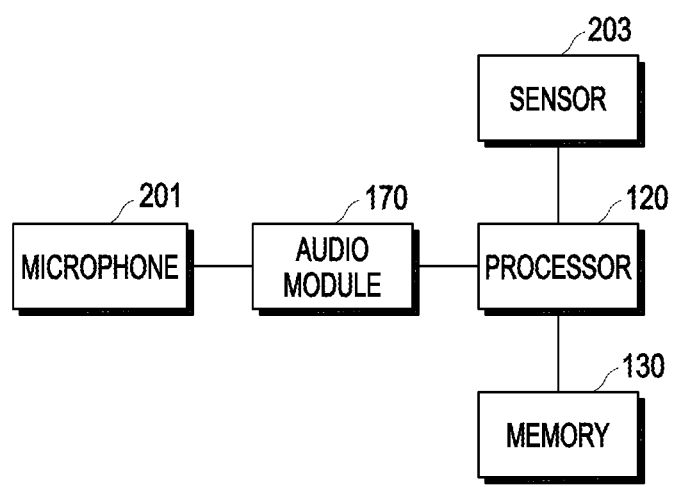
FIG. 2A is a block diagram illustrating components included in an electronic device according to an embodiment.

FIG. 2A is a block diagram illustrating components included in an electronic device 101 according to an embodiment.

According to an embodiment, an electronic device 101 may include a microphone 201 (e.g., the input module 150 of FIG. 1), an audio module 170, a sensor 203 (e.g., the sensor module 176 of FIG. 1), a memory 130, and/or a processor 120.

According to an embodiment, the microphone 201 may detect an external voice and output an electrical signal (e.g., an analog signal) (hereinafter, an audio signal) corresponding to the detected voice. According to various embodiments, one or more microphones may be included as components of the electronic device 101. According to an embodiment, the microphone 201 may include an air conduction microphone for detecting the voice transmitted through the air and/or an accelerometer for detecting voice by measuring the vibration of the electronic device 101.

According to an embodiment, the audio module 170 may receive an audio signal from the microphone 201 and perform signal processing on the received audio signal. For example, the audio module 170 may convert the received audio signal into a digital signal (hereinafter, audio data). For example, audio data may include pulse coded modulation (PCM)-type data. According to an embodiment, the audio module 170 may include an analog-digital converter (ADC) and/or a digital signal processor (DSP) which are described below in greater detail. According to an embodiment, the audio module 170 may, for example, be referred to as an audio subsystem or by other various terms.

According to an embodiment, the sensor 203 may include at least one of a gyroscope, an accelerometer, an angular velocity sensor, a proximity sensor, or an illuminance sensor. According to an embodiment, the sensor 203 may detect any occasion when the form of the electronic device 101 turns into any one of predesignated forms and output an electrical signal to the processor 120. For example, the predesignated forms may include at least one or more forms which are described below in greater detail below. According to an embodiment, the sensor 203 may be disposed on each of one or more housings forming the outer surface of the electronic device 101 and detect the movement (e.g., linear movement and/or rotational movement) of each housing and output an electrical signal corresponding thereto. According to an embodiment, the sensor 203 may be disposed on at least a portion of a hinge structure (e.g., the hinge structure 325 of FIG. 3C described below) of the electronic device 101 (e.g., a foldable-type electronic device) and detect a movement (e.g., linear movement and/or rotational movement) of each housing connected with the hinge structure (e.g., the hinge structure 325 of FIG. 3C described below) and output an electrical signal corresponding thereto. According to an embodiment, the sensor 203 may be disposed on at least a portion of a rotating member (e.g., the pinion gear and/or guide roller described below) of the electronic device 101 (e.g., a rollable-type electronic device) and detect an angle of rotation (or number of rotations) of the rotating member (e.g., the pinion gear and/or guide roller described below) and output an electrical signal corresponding thereto. According to an embodiment, at least one sensor 203 used to identify a change of a form of the electronic device 101 may also be referred to as a step sensor.

According to an embodiment, the processor 120 may perform and/or control the overall operation of the electronic device 101. For example, the processor 120 may process the electrical signal and/or data (e.g., audio data) received from another hardware component (e.g., the audio module 170 or the sensor 203), perform a designated operation based thereon, and/or control another hardware component (e.g., the audio module 170, the sensor 203, or the display (e.g., the display module 160 of FIG. 1)) to perform a designated operation. As another example, the processor 120 may access data stored in the memory 130, store data in the memory 130, or load the data stored in the memory 130 and provide it to an application. According to various embodiments, the processor 120 may include a main processor (e.g., the main processor 121 of FIG. 1) and/or an auxiliary processor (e.g., the auxiliary processor 123 of FIG. 1) (e.g., a DSP). The auxiliary processor 123 (e.g., DSP) may be included in the audio module 170.

According to an embodiment, the processor 120 may receive an electrical signal from the sensor 203 and identify whether the form of the electronic device 101 is changed based on the received electrical signal. For example, the processor 120 may identify that the form of the electronic device 101 is a first form (e.g., any one of Step 2 to Step (n−1) described below) if a first signal is received from the sensor 203 and identify that the form of the electronic device 101 is a second form (e.g., Step 1 or Step n described below) if a second signal is received. According to an embodiment, the first signal may indicate a Step value corresponding to the form of the electronic device 101 among Step 2 to Step (n−1) described below. According to an embodiment, the second signal may indicate a Step value corresponding to the form of the electronic device 101 of Step 1 or Step n described below. Meanwhile, the form of the electronic device 101 may include three or more forms. According to an embodiment, the processor 120 may identify the current form (e.g., changed form) of the electronic device 101 and/or that the form of the electronic device 101 is changed by identifying the Step value indicated by the first signal or second signal if receiving the first signal or the second signal. According to an embodiment, the first signal or the second signal may also indicate the direction in which the form of the electronic device 101 is changed. For example, the processor 120 may identify that the form of the electronic device 101 is changed into a form corresponding to Step (k−1) if receiving the first signal from the sensor 203 and that the form of the electronic device 101 is changed into a form corresponding to Step (k+1) if receiving the second signal when the form of the electronic device 101 is a form corresponding to Step k.

According to an embodiment, the processor 120 may identify the speed of a change of the form of the electronic device 101 based on electrical signals received from the sensor 203. For example, the processor 120 may identify the speed of a change of the form of the electronic device 101 from the first form to the second form based on the difference between the time when the first signal is received and the time when the second signal is received, which is described below in greater detail.

According to an embodiment, the processor 120 may receive audio data from the audio module 170. According to various embodiments, the processor 120 may provide the received audio data to an application (e.g., the application 146 of FIG. 1) or provide data based on the received audio data to the application 146.

According to an embodiment, the processor 120 may provide the audio data received from the audio module 170 to the application 146 or provide data based on the received audio data to the application 146, based on whether the form of the electronic device 101 is changed. According to an embodiment, upon identifying that the form of the electronic device 101 is changed, the processor 120 may identify noise data (e.g., pre-stored reference data) corresponding to the changed form of the electronic device 101 and/or the speed of a change of the form of the electronic device 101 and perform noise processing (e.g., noise reducing or noise canceling) on the audio data (hereinafter, first audio data) (in other words, raw data) received from the audio module 170 based on the identified noise data, thereby obtaining noise-reduced (or canceled) audio data (hereinafter, second audio data). For example, the noise processing (e.g., noise reducing or noise canceling) on the first audio data is a process for reducing or removing the noise signal indicated by the noise data on the first audio data and may adopt various techniques. According to an embodiment, upon failing to identify that the form of the electronic device 101 is changed, the processor 120 may provide the first audio data to the application 146 (e.g., provide the first audio data to the application 146 without performing noise processing based on the noise data (e.g., pre-stored reference data) on the first audio data).

According to an embodiment, the processor 120 may provide the audio data received from the audio module 170 to the application 146 or provide data based on the received audio data to the application 146, based on a running application (e.g., based on the type of the running application). According to an embodiment, if the running application is a first application (e.g., an application that converts the detected external voice into data and stores it in the memory 130, such as a recording application or a camera application), the processor 120 may provide the second audio data to the first application. According to an embodiment, the first application may include, e.g., a call application that converts the detected external voice or sound into data and transmits it to an external network (e.g., the second network 199 of FIG. 1). According to an embodiment, if the running application is the first application, the processor 120 may provide the first audio data or second audio data to the first application according to whether the form of the electronic device 101 is changed. For example, when the running application is the first application, upon identifying that the form of the electronic device 101 is changed, the processor 120 may provide the second audio data to the first application and, upon failing to identify that the form of the electronic device 101 is changed, provide the first audio data to the first application. According to an embodiment, if the running application is a second application (e.g., an application that mainly uses the user's voice among the external voices detected, such as a call application), the processor 120 may extract the user's voice from the first audio data and provide data for the extracted user voice to the second application. For example, voice activity detection (VAD) or other various techniques may be applied to extracting the user voice by the processor 120. According to an embodiment, upon identifying that the running application is the second application or a third application (e.g., an application different from the first application and the second application), the processor 120 may provide the first audio data to the third application (e.g., the corresponding running application).

According to an embodiment, the memory 130 may store various pieces of information and/or data for performing the operations described in the disclosure. For example, the memory 130 may previously store a plurality of noise data (e.g., reference data) (in other words, noise pattern data). According to an embodiment, the pre-stored noise data may include information about the noise pattern corresponding to the changed form of the electronic device 101 and/or the speed of a change of the form of the electronic device 101. According to an embodiment, the pre-stored noise data may be data learned based on the noise pattern corresponding to the changed form of the electronic device 101 and/or the speed of a change of the form of the electronic device 101. For example, in a quiet environment (e.g., an environment with less external noise), the external voice detected through the microphone 201 may be stored in relation to the method for a change of the form the electronic device 101 while changing of the form of the electronic device 101 by various methods. More specifically, obtained voice data (e.g., noise pattern) may be stored as noise data (e.g., reference data) in relation to the changed form of the electronic device 101 and/or the speed of a change of the form of the electronic device 101. According to an embodiment, the obtained voice data (e.g., noise pattern) may differ depending on the structure of the electronic device 101, the changed form of the electronic device 101 and/or the speed of a change of the form of the electronic device 101. If the electronic device 101 has the same structure (e.g., if the electronic device 101 is a transformable electronic device of the same type), the obtained voice data (e.g., noise pattern) may differ depending on the changed form of the electronic device 101 and/or the speed of a change of the form of the electronic device 101. For example, if the electronic device 101 is a foldable-type electronic device 101, the voice data (e.g., noise pattern) obtained when the electronic device 101 becomes the folded state (e.g., the 'folded state" of FIG. 3C described below) and the voice data (e.g., noise pattern) obtained when the electronic device 101 becomes the unfolded state (e.g., the 'unfolded state' of FIG. 3A described below) may differ from each other. For example, as the speed of a change of the form of the electronic device 101 increases, a relatively high frequency noise pattern (e.g., a noise pattern having a large high-frequency component) may be detected and, as the speed of a change of the form of the electronic device 101 decreases, a relatively low-frequency noise pattern (e.g., a noise pattern having a small high-frequency component) may be detected. According to an embodiment, the pre-stored noise data may be updated according to the actual use environment. For example, if the user uses the electronic device 101 with a case mounted on the housing of the electronic device 101, the noise pattern generated when the form of the electronic device 101 is changed may differ from the pre-stored noise data. Upon identifying that the electronic device 101 is used with a case mounted (e.g., if information indicating that a case is mounted is input to the electronic device 101 by the user), the electronic device 101 may detect the external voice through the microphone 201 when the form of the case-mounted electronic device 101 is changed and update the pre-stored noise data (e.g., reference data) with the obtained voice data (e.g., noise pattern) related to the changed form of the electronic device 101 and/or the speed of a change of the form of the electronic device 101.

According to an embodiment, the pre-stored noise data may be classified and stored in the form as shown in Table 1 below.

TABLE 1

| changed form | time of a change of a form ($t_f$) [s] (speed of a change of a form ($v_f$) [m/s]) | noise data |
|---|---|---|
| Step 1 | $t_f < t_1$ ($v_1 < v_f$) | reference $a_1$ |
| | $t_1 \leq t_f < t_2$ ($v_2 \leq v_f < v_1$) | reference $a_2$ |
| | $t_2 \leq t_f < t_3$ ($v_3 \leq v_f < v_2$) | reference $a_3$ |
| | . . . | . . . |
| Step n | $t_f < t_1$ ($v_1 < v_f$) | reference $b_1$ |
| | $t_1 \leq t_f < t_2$ ($v_2 \leq v_f < v_1$) | reference $b_2$ |
| | $t_2 \leq t_f < t_3$ ($v_3 \leq v_f < v_2$) | reference $b_3$ |
| | . . . | . . . |

In Table 1, the "changed form" may refer, for example, to the final form (e.g., the current form after a change) of the changed electronic device 101, the "time of a change of a form" may refer, for example, to the time when a form of the electronic device 101 is changed, the "speed of a change of a form" may refer, for example, to the speed at which a form of the electronic device 101 is changed, and the "noise data" may refer, for example, to pre-stored reference data used for noise processing. For example, the "time of a change of a form" may be a difference value between the time of reception of an electrical signal (e.g., first signal) from the sensor 203 when the electronic device 101 is in a previous form and the time point of reception of an electrical signal (e.g., second signal) from the sensor 203 when the electronic device 101 is in a current form (e.g., the form into which the previous form is changed). For example, the "speed of a change of a form" may be a value proportional to the reciprocal of the "time of a change of a form". Referring to Table 1, upon noise processing on the first audio data, different noise data (e.g., reference data) may be identified according to the changed form of the electronic device 101 and/or the time of a change of a form of the electronic device 101. According to an embodiment, the noise data (e.g., reference data) used for noise processing on the first audio data, may be based on either the changed form of the electronic device 101 or the time of a change of a form of the electronic device 101. For example, different noise data may be used depending on the changed form of the electronic device 101 regardless of the time of a change of a form of the electronic device 101. For example, different noise data may also be used depending on the time of a change of a form of the electronic device 101 regardless of the changed form of the electronic device 101.

Figure 2B:
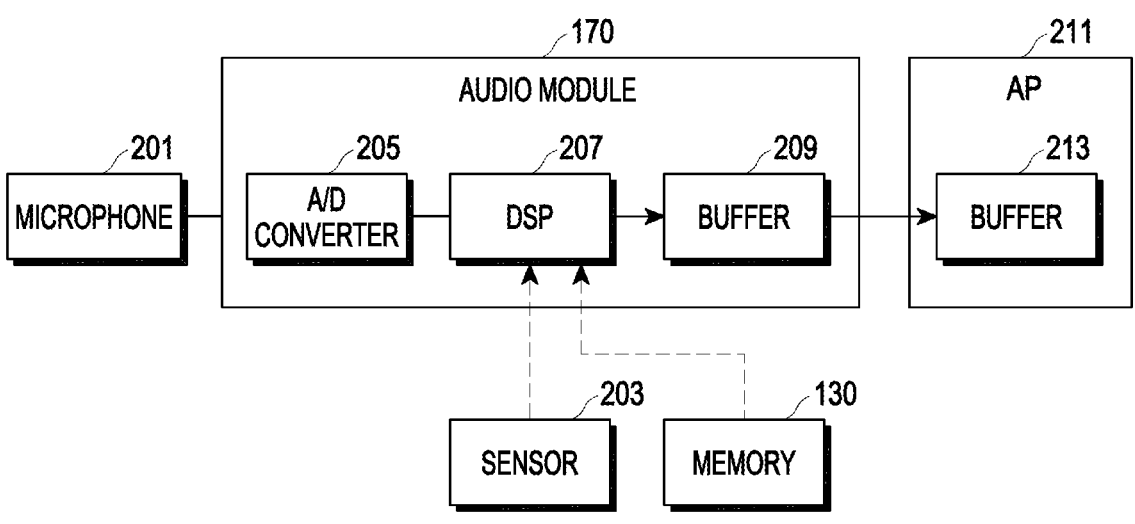
FIG. 2B is a block diagram illustrating components included in an electronic device according to an embodiment.

FIG. 2B is a block diagram illustrating components included in an electronic device 101 according to an embodiment. No duplicate description is presented below of components described above in connection with FIG. 2A.

According to an embodiment, an electronic device 101 may include a microphone 201 (e.g., the input module 150 of FIG. 1), an audio module 170, a sensor 203 (e.g., the sensor module 176 of FIG. 1), a memory 130, and/or an application processor (AP) 211 (e.g., the main processor 121 of FIG. 1).

According to an embodiment, the memory 130 may be included in the audio module 170. According to an embodiment, the memory 130 may not be included in the audio module 170 (e.g., may be disposed outside or included in the AP 211).

According to an embodiment, the audio module 170 may include an A/D converter 205, a DSP 207, and/or a buffer 209 (e.g., the volatile memory 132 of FIG. 1).

According to an embodiment, the A/D converter 205 may convert the audio signal received from the microphone 201 into a digital signal (e.g., audio data). For example, audio data may include pulse coded modulation (PCM)-type data.

According to an embodiment, the DSP 207 may perform at least some of the operations of the processor 120 described in FIG. 2A. For example, the DSP 207 may receive an electrical signal from the sensor 203 and identify whether a form of the electronic device 101 is changed based on the received electrical signal. For example, the DSP 207 may identify the speed of a change of a form of the electronic device 101 based on electrical signals received from the sensor 203. For example, the DSP 207 may receive the first audio data (in other words, raw data) from the A/D converter 205, provide the first audio data to the AP 211, or obtain first audio data-based data (e.g., second audio data) using the noise data stored in the memory 130 and provide it to the AP 211. For example, the DSP 207 may temporarily store the first audio data and/or the second audio data in the buffer 209 and then provide it the buffer 213 (e.g., the volatile memory 132 of FIG. 1) of the AP 211. According to an embodiment, the AP 211 may include an application layer, an audio hardware abstraction layer (HAL), and/or kernel. That the DSP 207 provides the first audio data and/or second audio data to the AP 211 (e.g., the buffer 213) may include providing the first audio data and/or second audio data to the audio HAL. According to an embodiment, that the DSP 207 provides the first audio data to the AP 211 (e.g., the buffer 213) without performing noise processing based on the noise data (e.g., the pre-stored reference data) on the first audio data may be described as bypassing the first audio data to the AP 211 (e.g., the buffer 213).

According to an embodiment, the AP 211 may perform at least some of the operations of the processor 120 described in FIG. 2A. For example, the AP 211 may provide the first audio data and/or second audio data, provided from the DSP 207 and stored in the buffer 213, to the running application.

Figure 3A:
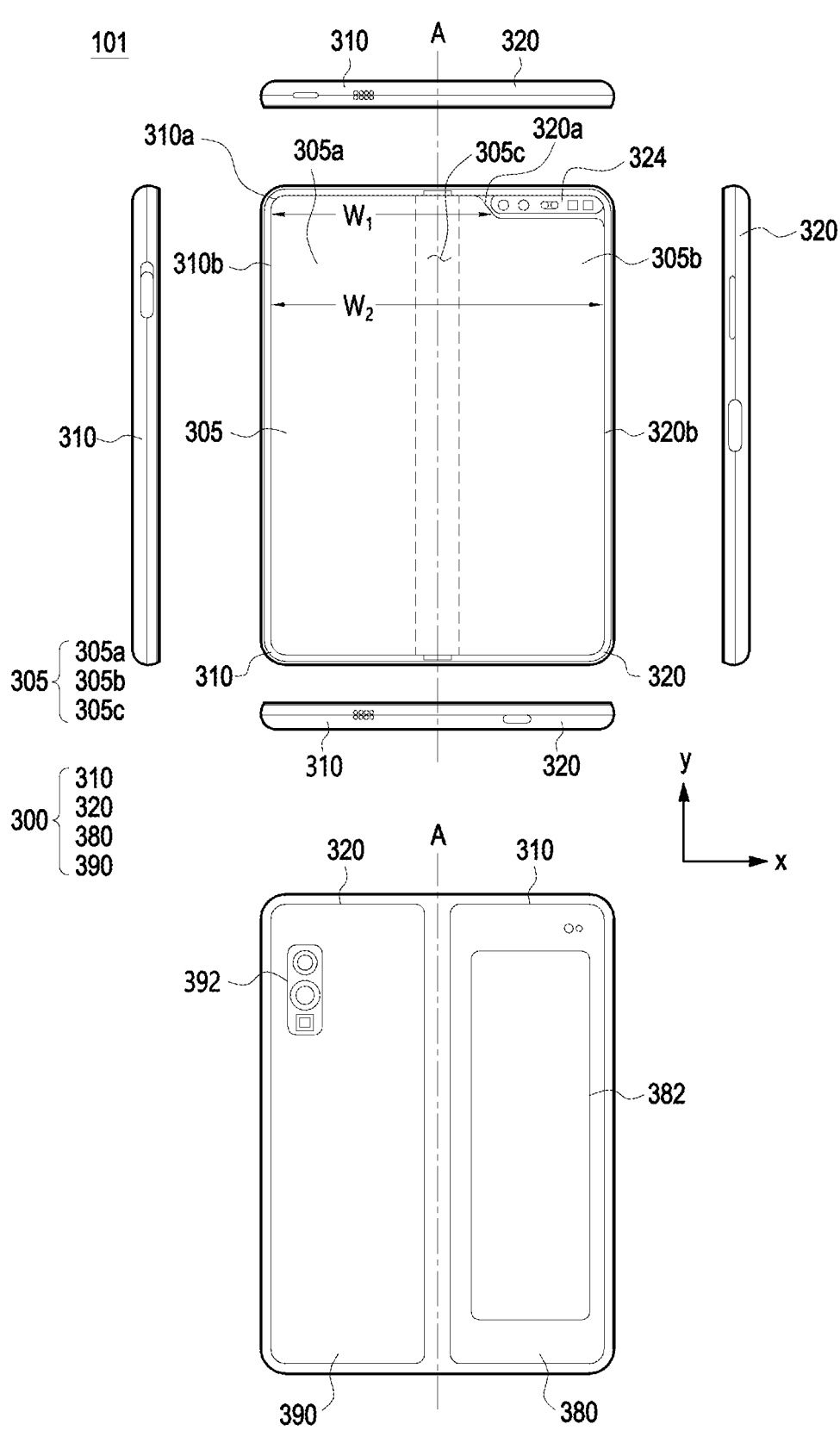
FIG. 3A is a diagram illustrating a view of an unfolded state of an electronic device according to an embodiment.
Figure 3B:
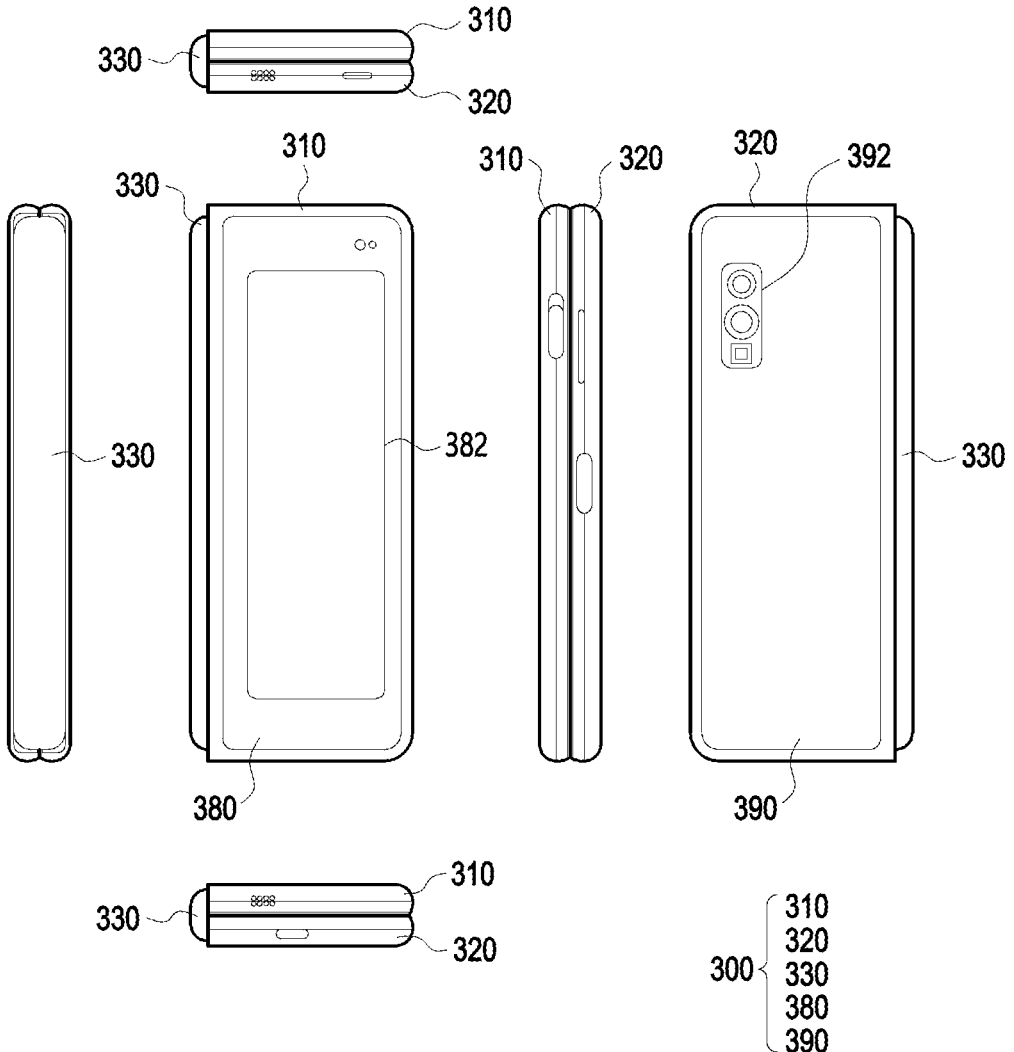
FIG. 3B is a diagram illustrating a view of a folded state of an electronic device according to an embodiment.
Figure 3C:
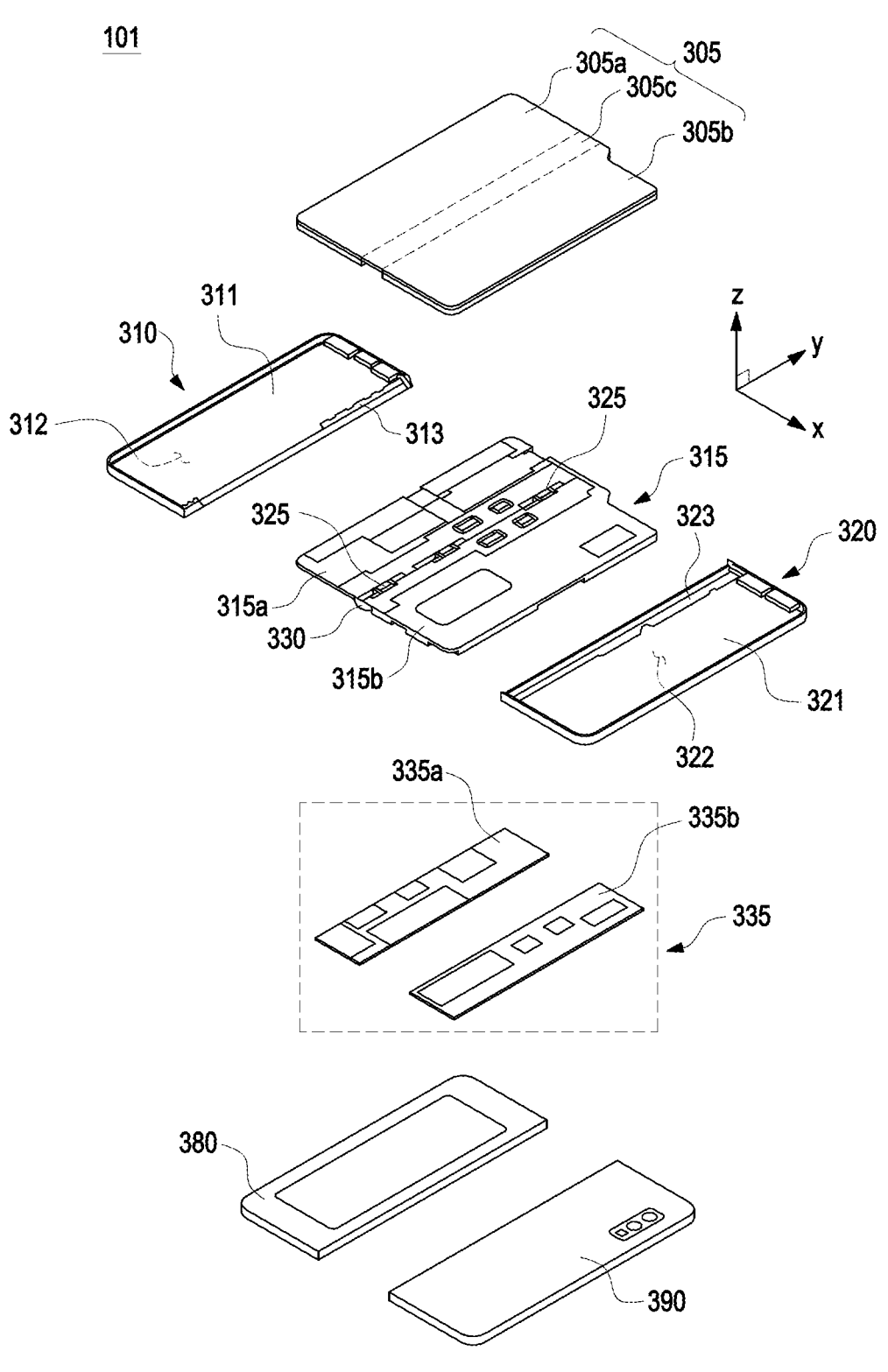
FIG. 3C is a diagram illustrating an exploded perspective view of an electronic device according to an embodiment.

FIGS. 3A, 3B, and 3C are diagrams illustrating a foldable-type electronic device 101, as an example of the electronic device 101 according to an embodiment. FIG. 3A is a diagram illustrating a view of an unfolded state of an electronic device 101 according to an embodiment. FIG. 3B is a diagram illustrating a view of a folded state of an electronic device 101 according to an embodiment. FIG. 3C is a diagram illustrating an exploded perspective view of an electronic device 101 according to an embodiment.

Referring to FIGS. 3A and 3B, according to an embodiment, an electronic device 101 may include a foldable housing 300, a hinge cover 330 covering a foldable portion of the foldable housing 300, and a flexible or foldable display 305 (hereinafter, simply "display 305") (e.g., the display module 160 of FIG. 1) disposed in a space formed by the foldable housing 300. According to an embodiment, the surface where the display 305 is disposed (or the surface where the display 305 is viewed from the outside of the electronic device 101) may be defined as the front surface of the electronic device 101. The opposite surface of the front surface may be defined as a rear surface of the electronic device 101. The surface surrounding the space between the front and back surfaces may be defined as a side surface of the electronic device 101.

According to an embodiment, the foldable housing 300 may include a first housing structure 310, a second housing structure 320 including a sensor area 324, a first rear cover 380, a second rear cover 390, and a hinge structure (e.g., the hinge structure 325 of FIG. 3C). The foldable housing 300 of the electronic device 101 is not limited to the shape and coupling shown in FIGS. 3A and 3B, but may rather be implemented in other shapes or via a combination and/or coupling of other components. For example, the first housing structure 310 and the first rear cover 380 may be integrally formed with each other, and the second housing structure 320 and the second rear cover 390 may be integrally formed with each other.

According to an embodiment, the first housing structure 310 may be connected to the hinge structure (e.g., the hinge structure 325 of FIG. 3C) and may include a first surface (e.g., the first surface 311 of FIG. 3C) facing in a first direction and a second surface (e.g., the second surface 312 of FIG. 3C) facing in a second direction opposite to the first direction. The second housing structure 320 may be connected to the hinge structure 325 and may include a third surface (e.g., the third surface 321 of FIG. 3C) facing in a third direction and a fourth surface (e.g., the fourth surface 322 of FIG. 3C) facing in a fourth direction opposite to the third direction, and may rotate about the hinge structure 325 (e.g., the folding axis A) with respect to the first housing structure 310. The electronic device 101 may transform into a folded state or an unfolded state, which is described below with reference to FIG. 3C. Here, the direction may refer, for example, to a direction parallel to the plane or a normal direction of the plane.

According to an embodiment, in the fully folded state of the electronic device 101, the first surface may face the third surface and, in the fully unfolded state, the third direction may be substantially identical to the first direction.

According to an embodiment, the first housing structure 310 and the second housing structure 320 may be positioned on opposite sides of a folding axis A, and they may be overall symmetrical in shape with each other with respect to the folding axis A. As described below, the angle or distance between the first housing structure 310 and the second housing structure 320 may be varied depending on whether the electronic device 101 is in the unfolded state, the folded state, or the partially unfolded (or partially folded) intermediate state. According to an embodiment, the second housing structure 320 further includes the sensor area 324 where various sensors are disposed, unlike the first housing structure 310 but, in the remaining area, the second housing structure 320 may be symmetrical in shape with the first housing structure 310.

According to an embodiment, as shown in FIG. 3A, the first housing structure 310 and the second housing structure 320 together may form a recess to receive the display 305. In an embodiment, due to the sensor area 324, the recess may have two or more different widths in the direction perpendicular to the folding axis A.

According to an embodiment, the recess may have a first width Wi between a first portion 310a of the first housing structure 310, which is perpendicular with the folding axis A, and a first portion 320a of the second housing structure 320, which is formed at an edge of the sensor area 324. The recess may have a second width W2 formed by a second portion 310b of the first housing structure 310 and a second portion 320b of the second housing structure 320, which does not correspond to the sensor area 324 and is perpendicular with the folding axis A. In this case, the second width w2 may be longer than the first width w1. As another example, the first portion 310a of the first housing structure 310 and the first portion 320a of the second housing structure 320, which are asymmetrical with each other, may form the first width w1 of the recess, and the second portion 310b of the first housing structure 310 and the second portion 320b of the second housing structure 320, which are symmetrical with each other, may form the second width w2 of the recess. According to an embodiment, the first portion 320a and second portion 320b of the second housing structure 320 may differ in distance from the folding axis A. The width of the recess is not limited thereto. According to another embodiment, the recess may have a plurality of widths due to the shape of the sensor area 324 or the asymmetric portions of the first housing structure 310 and the second housing structure 320.

According to an embodiment, at least a portion of the first housing structure 310 and the second housing structure 320 may be formed of a metal or a non-metal material having a predetermined degree of rigidity to support the display 305. At least a portion formed of metal may provide a ground plane of the electronic device 101 and may be electrically connected with a ground line formed on a printed circuit board (e.g., the circuit board unit 335 of FIG. 3C).

According to an embodiment, the sensor area 324 may be formed adjacent to a corner of the second housing structure 320 and to have a predetermined area. However, the placement, shape, or size of the sensor area 324 is not limited to those illustrated. For example, in another embodiment, the sensor area 324 may be provided in a different corner of the second housing structure 320 or in any area between the top corner and the bottom corner. In an embodiment, components for performing various functions, embedded in the electronic device 101, may be exposed, i.e., visible, through the sensor area 324 or one or more openings in the sensor area 324 to the front surface of the electronic device 101. In an embodiment, the components may include various kinds of sensors. The sensor may include at least one of, e.g., a front-facing camera, a receiver, or a proximity sensor.

According to an embodiment, the first rear cover 380 may be disposed on one side of the folding axis A on the rear surface of the electronic device 101 and have, e.g., a substantially rectangular periphery which may be surrounded by the first housing structure 310. Similarly, the second rear cover 390 may be disposed on the opposite side of the folding axis A on the rear surface of the electronic device 101 and its periphery may be surrounded by the second housing structure 320.

According to an embodiment, the first rear cover 380 and the second rear cover 390 may be substantially symmetrical in shape with respect to the folding axis A. However, the first rear cover 380 and the second rear cover 390 are not necessarily symmetrical in shape. In an embodiment, the electronic device 101 may include the first rear cover 380 and the second rear cover 390 in various shapes. According to an embodiment, the first rear cover 380 may be integrally formed with the first housing structure 310, and the second rear cover 390 may be integrally formed with the second housing structure 320.

According to an embodiment, the first rear cover 380, the second rear cover 390, the first housing structure 310, and the second housing structure 320 may form a space where various components (e.g., a printed circuit board or battery) of the electronic device 101 may be disposed. According to an embodiment, one or more components may be arranged or visually exposed on/through the rear surface of the electronic device 101. For example, at least a portion of a sub display may be exposed, i.e., visible, through a first rear surface area 382 of the first rear cover 380. In an embodiment, one or more components or sensors may be visually exposed through a second rear surface area 392 of the second rear cover 390. According to an embodiment, the sensor may include a proximity sensor and/or a rear-facing camera.

According to an embodiment, a front camera exposed to the front surface of the electronic device 101 through one or more openings prepared in the sensor area 324 or a rear camera exposed through a second rear surface area 392 of the second rear cover 390 may include one or more lenses, an image sensor, and/or an image signal processor. The flash may include, e.g., a light emitting diode (LED) or a xenon lamp. According to an embodiment, two or more lenses (e.g., an infrared (IR) camera, a wide-angle lens, and a telescopic lens) and image sensors may be disposed on one surface of the electronic device 101.

Referring to FIG. 3B, the hinge cover 330 may be disposed between the first housing structure 310 and the second housing structure 320 to hide the internal components (e.g., the hinge structure 325 of FIG. 3C). According to an embodiment, the hinge cover 330 may be hidden by a portion of the first housing structure 310 and second housing structure 320 or be exposed to the outside depending on the state (e.g., the unfolded state, intermediate state, or folded state) of the electronic device 101.

According to an embodiment, as shown in FIG. 3A, in the unfolded state (e.g., a fully unfolded state) of the electronic device 101, the hinge cover 330 may be hidden not to be exposed by the first housing structure 310 and the second housing structure 320. As another example, as shown in FIG. 3B, in the folded state (e.g., a fully folded state) of the electronic device 101, the hinge cover 330 may be exposed to the outside between the first housing structure 310 and the second housing structure 320. As an example, in an intermediate state in which the first housing structure 310 and the second housing structure 320 are folded with a certain angle, the hinge cover 330 may be partially exposed to the outside between the first housing structure 310 and the second housing structure 320. In this case, however, the exposed area may be smaller than in the fully folded state. According to an embodiment, the hinge cover 330 may include a curved surface.

According to an embodiment, the display 305 may be disposed in a space formed by the foldable housing 300. For example, the display 305 may be seated in a recess formed by the foldable housing 300 and may be seen from the outside through the front surface of the electronic device 101. For example, the display 305 may constitute most of the front surface of the electronic device 101. Thus, the front surface of the electronic device 101 may include the display 305 and a partial area of the first housing structure 310 and a partial area of the second housing structure 320, which are adjacent to the display 305. The rear surface of the electronic device 101 may include the first rear cover 380, a partial area of the first housing structure 310, which is adjacent to the first rear cover 380, the second rear cover 390, and a partial area of the second housing structure 320, which is adjacent to the second rear cover 390.

According to an embodiment, the display 305 may refer, for example, to a display at least a portion of which may be transformed into a flat or curved surface. According to an embodiment, the display 305 may include a folding area 305c, a first area 305a disposed on one side of the folding area 305c (e.g., a left side of the folding area 305c of FIG. 3A), and a second area 305b disposed on the other side of the folding area 305c (e.g., a right side of the folding area 305c of FIG. 3A).

However, the segmentation of the display 305 as shown in FIG. 3A is merely an example, and the display 305 may be divided into a plurality of (e.g., four or more, or two) areas depending on the structure or function of the display 200. For example, in the embodiment illustrated in FIG. 3A, the display 305 may be divided into the areas by the folding area 305c or folding axis A extending in parallel with the y axis but, in another embodiment, the display 305 may be divided into the areas with respect to another folding area (e.g., a folding area parallel with the x axis) or another folding axis (e.g., a folding axis parallel with the x axis).

According to an embodiment, the first area 305a and the second area 305b may be overall symmetrical in shape with respect to the folding area 305c. However, unlike the first area 305a, the second area 305b may include a notch depending on the presence of the sensor area 324, but the rest may be symmetrical in shape with the first area 305a. In other words, the first area 305a and the second area 305b may include symmetrical portions and asymmetrical portions.

Described below are the operation of the first housing structure 310 and the second housing structure 320 and each area of the display 305 depending on the state (e.g., the folded state, unfolded state, or intermediate state) of the electronic device 101.

According to an embodiment, when the electronic device 101 is in the unfolded state (e.g., FIG. 3A), the first housing structure 310 and the second housing structure 320 may be disposed to face in the same direction while being angled at 180 degrees therebetween. The surface of the first area 305a and the surface of the second area 305b of the display 305 may be angled at 180 degrees therebetween while facing in the same direction (e.g., forward of the front surface of the electronic device). The folding area 305c may form substantially the same plane as the first area 305a and the second area 305b.

According to an embodiment, when the electronic device 101 is in the folded state (e.g., FIG. 3B), the first housing structure 310 and the second housing structure 320 may face each other. The surface of the first area 305a and the surface of the second area 305b of the display 305 may be angled at a small angle (e.g., ranging from 0 degrees to 10 degrees) therebetween while facing each other. At least a portion of the folding area 305c may have a curved surface with a predetermined curvature.

According to an embodiment, in the intermediate state of the electronic device 101, the first housing structure 310 and the second housing structure 320 may be arranged at a certain angle therebetween. The surface of the first area 305a of the display 305 and the surface of the second area 305b may form an angle which is larger than the angle in the folded state and smaller than the angle in the unfolded state. The folding area 305c may at least partially have a curved surface with a predetermined curvature and, in this case, the curvature may be smaller than that when it is in the folded state.

FIG. 3C is a diagram illustrating an exploded perspective view of an electronic device 101 according to an embodiment. According to an embodiment, an electronic device 101 may include a foldable housing 300, a display 305, and a board unit 335. The foldable housing may include a first housing structure 310, a second housing structure 320, a bracket assembly 315, a first rear cover 380, a second rear cover 390, and a hinge structure 325.

According to an embodiment, the display device 305 may include a display panel (e.g., a flexible display panel) and one or more plates or layers on which the display panel is seated. In an embodiment, the supporting plate may be disposed between the display panel and the bracket assembly 315. An adhesive structure (not shown) may be positioned between the supporting plate and the bracket assembly 315, adhering the supporting plate and the bracket assembly 315.

According to an embodiment, the bracket assembly 315 may include a first bracket assembly 315a and a second bracket assembly 315b. The hinge structure 325 may be disposed between the first bracket assembly 315a and the second bracket assembly 315b, and when the hinge structure 325 is viewed from the outside, a hinge cover 330 covering the hinge structure 325 may be disposed. As another example, a printed circuit board (e.g., a flexible printed circuit (FPC)) may be disposed to cross the first bracket assembly 315a and the second bracket assembly 315b.

According to an embodiment, the board unit 335 may include a first main circuit board 335a disposed on a side of the first bracket assembly 315a and a second main circuit board 335b disposed on a side of the second bracket assembly 315b. The first main circuit board 335a and the second main circuit board 335b may be disposed in a space formed by the bracket assembly 315, the first housing structure 310, the second housing structure 320, the first rear cover 380, and the second rear cover 390. Components for implementing various functions of the electronic device 101 may be mounted on the first main circuit board 335a and the second main circuit board 335b.

According to an embodiment, the first housing structure 310 and the second housing structure 320 may be assembled together to be coupled to two opposite sides of the bracket assembly 315, with the display 305 coupled to the bracket assembly 315. For example, the first housing structure 310 and the second housing structure 320 may slide to both sides of the bracket assembly 315 and fit with the bracket assembly 315.

According to an embodiment, the first housing structure 310 may include a first surface 311 and a second surface 312 facing away from the first surface 311, and the second housing structure 320 may include a third surface 321 and a fourth surface 322 facing away from the third surface 321. According to an embodiment, the first housing structure 310 may include a first rotation supporting surface 313, and the second housing structure 320 may include a second rotation supporting surface 323 corresponding to the first rotation supporting surface 313. The first rotation supporting surface 313 and the second rotation supporting surface 323 may include a curved surface corresponding to a curved surface included in the hinge cover 330.

According to an embodiment, the first rotation supporting surface 313 and the second rotation supporting surface 323, in the unfolded state of the electronic device 101 (e.g., the electronic device of FIG. 3A), may cover the hinge cover 330, allowing the hinge cover 330 to be not exposed or minimally exposed through the rear surface of the electronic device 101. The first rotation supporting surface 313 and the second rotation supporting surface 323, in the folded state of the electronic device 101 (e.g., the electronic device 101 of FIG. 3B), may rotate along the curved surface included in the hinge cover 330, allowing the hinge cover 330 to be maximally exposed through the rear surface of the electronic device 101.

Figure 4A:
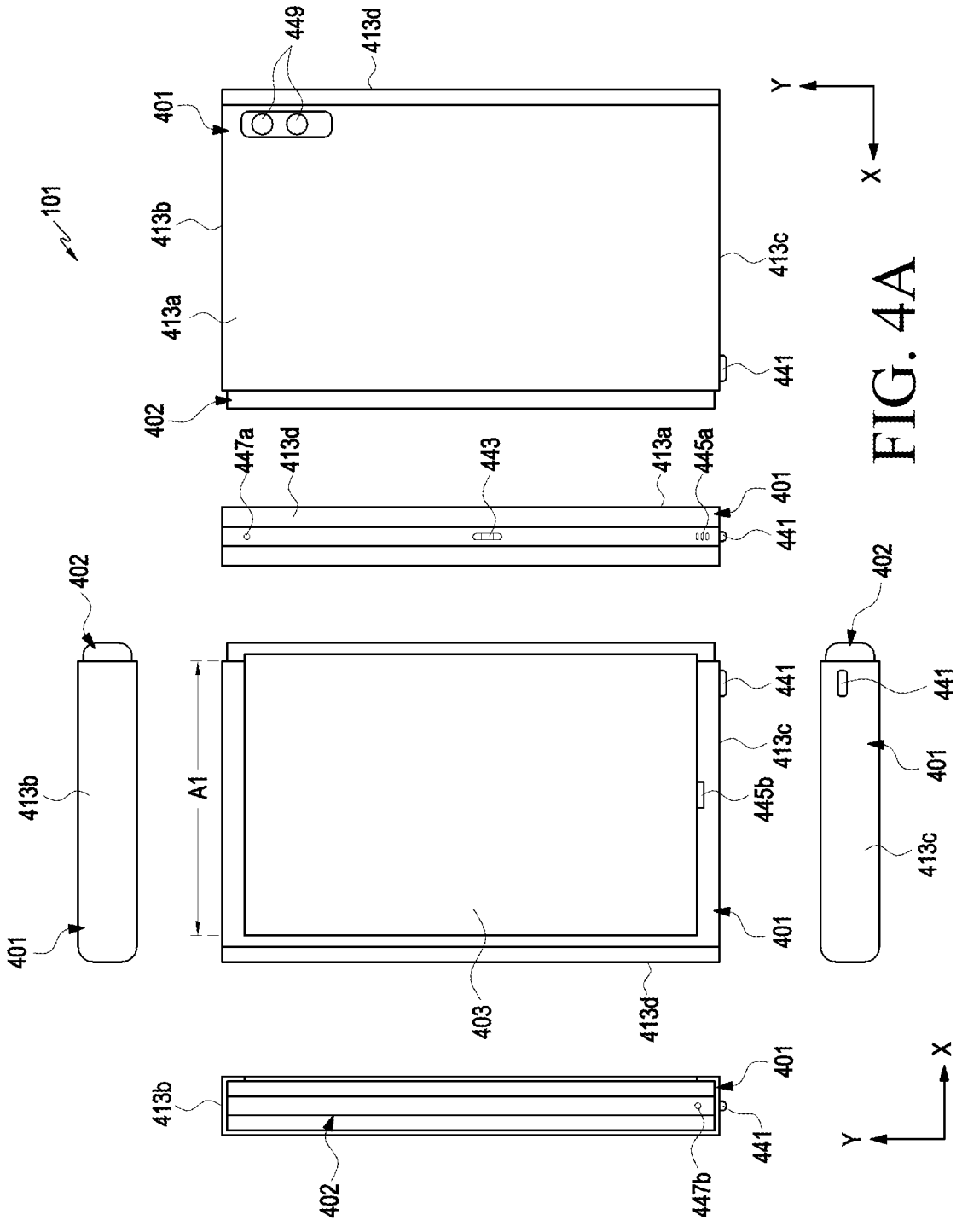
FIG. 4A is a diagram illustrating six-side view of a state in which a second housing is received in an electronic device according to an embodiment.
Figure 4B:
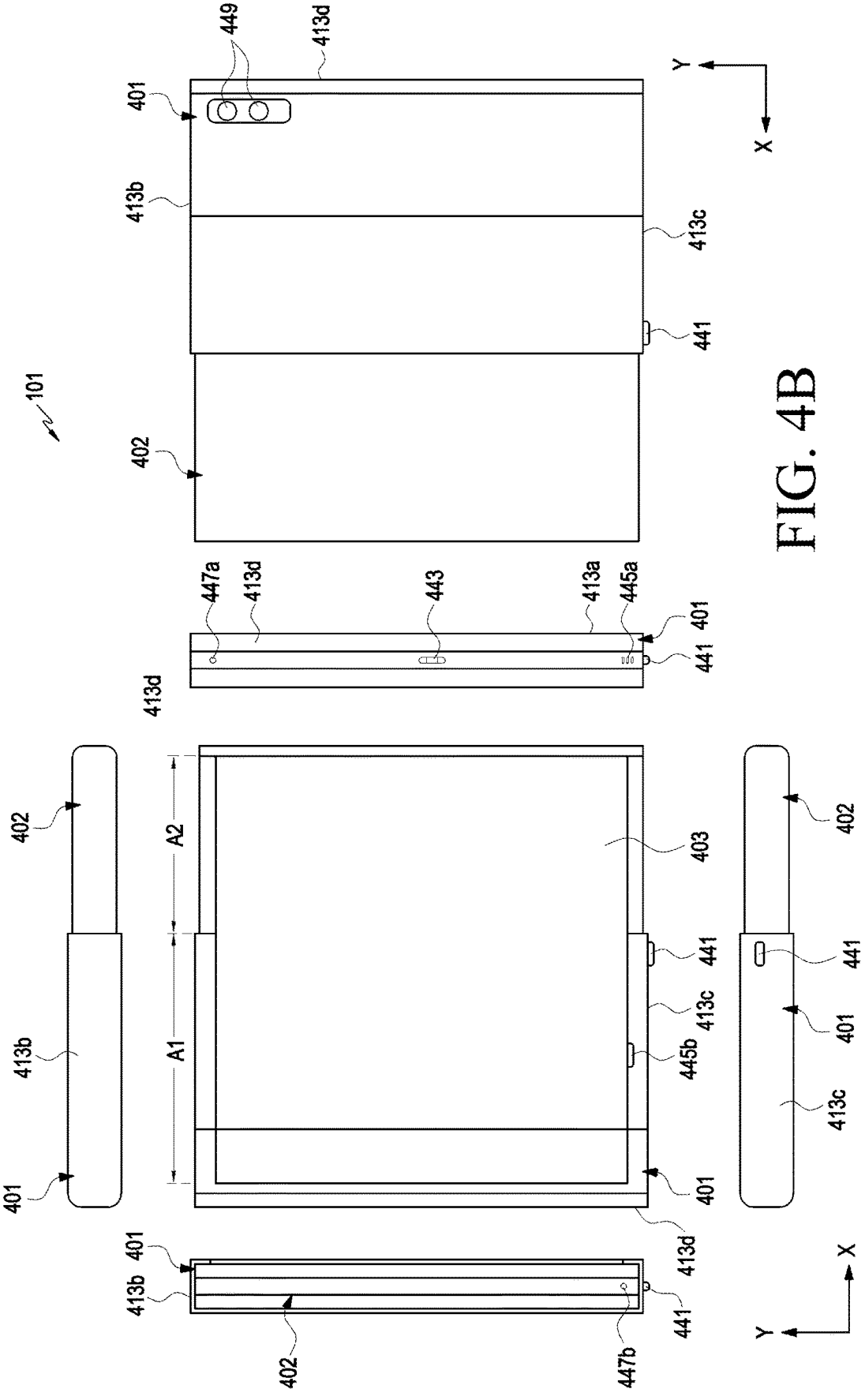
FIG. 4B is a diagram illustrating a six-side view of state in which a second housing is drawn out from an electronic device according to an embodiment.

FIGS. 4A and 4B are diagrams illustrating a rollable-type electronic device 101, as an example of the electronic device 101 according to an embodiment. FIG. 4A is a diagram illustrating a six-side view of a state in which a second housing 402 is received in an electronic device 101 according to an embodiment. FIG. 4B is a diagram illustrating six-side view of a state in which a second housing 402 is drawn out from an electronic device 101 according to an embodiment.

Referring to FIGS. 4A and 4B, an electronic device 101 may include a first housing 401, a second housing 402 slidably coupled to the first housing 401, and/or a flexible display 403. The second housing 402 may linearly reciprocate in one direction (e.g., the X-axis direction) between the position where it is received in the first housing 401 and the position slid by a designated distance to be drawn out. In an embodiment, the direction in which the second housing 402 linearly reciprocates may be defined as a length direction (e.g., Y-axis direction) or width direction (e.g., X-axis direction) of the electronic device 101 and this may be arbitrarily defined depending on the direction in which the electronic device 101 is aligned or disposed. In the following detailed description, the state shown in FIG. 4A may be referred to as a 'received position,' and the state shown in FIG. 4B may be referred to as a 'drawn-out position.' In an embodiment, the state shown in FIG. 4A may be referred to as a 'closed state,' and the state shown in FIG. 4B may be referred to as an 'opened state'.

According to an embodiment, the first housing 401 may be referred to as a main housing, a first slide part or a first slide housing and may be coupled to surround the rear surface of the second housing 402 and two opposite side surfaces (e.g., the surface facing in the −Y direction and the surface facing in the +Y direction) connected to the rear surface. In an embodiment, the first housing 401 may have a structure that further surrounds another side surface (e.g., the surface facing in the −X direction) of the second housing 402, and the second housing 402 may slide in the +X direction from the state received in the first housing 401 to be drawn out from the first housing 401. Some electrical/electronic components (e.g., the camera module 449) may be received in the first housing 401, and in general, the inner space of the first housing 401 may be utilized as a space for receiving the second housing 402.

According to an embodiment, the first housing 401 may include a rear plate 413a, a first sidewall 413b extending from the rear plate 413a, a second sidewall 413c extending from the rear plate 413a and disposed to be substantially parallel to the first sidewall 413b, and a third sidewall 413d extending from the rear plate 413a and connecting the first sidewall 413b and the second sidewall 413c. The rear plate 413a, the first sidewall 413b, the second sidewall 413c, and/or the third sidewall 413d may be disposed to respectively face the outer surfaces (e.g., the rear surface and/or side surfaces) of the second housing 402 corresponding thereto. For example, the rear plate 413a, the first sidewall 413b, the second sidewall 413c, and/or the third sidewall 413d may form a space substantially receiving the second housing 402, and the surface of the first housing 401 facing in the +X direction and/or the surface facing forward of the electronic device 101 may be substantially opened. In an embodiment, the second housing 402 may be interpreted as sliding with respect to the first housing 401 while being substantially guided by the first sidewall 413b and the second sidewall 413c.

According to an embodiment, the second housing 402 may be referred to as a sub housing, a second slide part, or a second slide housing and be coupled to the first housing 401 to linearly reciprocate between the received position of FIG. 4A and the drawn-out position of FIG. 4B. Although not shown, a main circuit board on which hardware, such as the processor 120 or communication module 190 of FIG. 1 is mounted, and electric/electronic components, such as the battery 189 and/or the sensor module 176, may be received in the inner space of the second housing 402. In an embodiment, the electronic device 101 may further include a rack gear 443 disposed on the first housing 401 and a pinion gear (not shown) rotatably disposed on the second housing 402. As the pinion gear (not shown) is engaged with the rack gear 443 and rotated, the second housing 402 may be slid with respect to the first housing 401. According to an embodiment, the second housing 402 may be received substantially in the first housing 401 in a state in which the side surface facing in the +X direction is exposed to the outside in the received position. In another embodiment, in the drawn-out position, the rear surface of the second housing 402, the surface facing in the −Y direction, and/or the surface facing in the +Y direction may be substantially exposed to the outside.

According to an embodiment, the flexible display 403 may include a first area A1 and a second area A2 extending from the first area A1 and be coupled with or disposed adjacent to a touch detection circuit, a pressure sensor capable of measuring the strength (pressure) of touch, and/or a digitizer for detecting a magnetic-type stylus pen. In an embodiment, the first area A1 may be disposed on the first housing 401 to output a screen forward of the electronic device 101. In an embodiment, the space for receiving the first housing 401 may be at least partially defined by the flexible display 403. For example, in the received position, the second housing 402 may be received in a space between the rear plate 413a and the flexible display 403 (e.g., the first area A1). In an embodiment, the second area A2 may be substantially disposed on the second housing 402 and, as the second housing 402 slides, be received in the second housing 402 or exposed to the outside of the second housing 402. For example, in the received position, the second area A2 may be received in the second housing 402 to be disposed to at least partially face in the opposite direction to the first area A1 and, in the drawn-out position, be exposed to the outside of the second housing 402 to be disposed in parallel to one side of the first area A1.

According to an embodiment, the portion received in the second housing 402 and/or the portion exposed to the outside of the second housing 402 to be positioned parallel to one side of the first area A1, of the second area A2, together with the first area A1, may maintain the substantially flat plate shape. In an embodiment, in the operation of being received in the second housing 402 or exposed to the outside, the second area A2 may be moved and/or transformed while being guided by the guide roller at the edge of the second housing 402. For example, the second area A2 may be received in the second housing 402 or exposed to the outside while the portion corresponding to the guide roller (not shown) is transformed into a curved shape and/or while being guided by the guide roller (not shown). According to an embodiment, the pinion gear (not shown) or the guide roller (not shown) may further include a sensor module (e.g., an angle sensor) capable of determining the angle of rotation of the pinion gear (not shown) or the guide roller (not shown). According to an embodiment, the processor (e.g., the processor 120 of FIG. 1) may identify the angle of rotation of the pinion gear (not shown) or the guide roller (not shown) through the sensor module (e.g., angle sensor) and determine the degree of extension (e.g., the size of the display area) of the flexible display (e.g., the display module 160 of FIG. 1) using the identified angle. For example, when the rotation angle of the sensor module (e.g., angle sensor) is 180 degrees, the processor 120 according to an embodiment may determine that the area of the extendible flexible display is extended by 50%. According to an embodiment, the operation in which the second area A2 is moved while being guided by the guide roller (not shown) may interwork with the slide of the second housing 402. For example, when the second housing 402 is received in the first housing 401, the second area A2 may be gradually received in the second housing 402 and, when the second housing 402 is drawn out to the outside of the first housing 401, the second area A2 may be gradually exposed to the outside of the second housing 402. In an embodiment, while the second housing 402 slides, the portion corresponding to the guide roller (not shown) (e.g., portion contacting it) of the second area A2 may be transformed into a curved shape. The electronic device 101 may support the flexible display 403, e.g., the second area A2, in a flat plate shape or guide it to be transformed into a curved shape by further including an articulated hinge structure.

According to an embodiment, at least a portion of the second area A2 may be received in the second housing 402 or exposed to the outside of the second housing 402, with any position adjacent to the guide roller (not shown) used as the boundary. In an embodiment, in the state of being received in the second housing 402, the second area A2 may not be activated and, in the state of being exposed to the outside of the second housing 402 or partially exposed, a portion (e.g., the externally exposed portion) may be activated. In an embodiment, in the operation of being received in the second housing 402, the second area A2 may be gradually inactivated and, in the externally exposed operation, the second area A2 may be gradually activated. "Gradually inactivated or activated" may refer, for example, to the portion received in the second housing 402, of the second area A2, being inactivated, and the portion exposed to the outside of the second housing 402 being activated. In an embodiment, in a state in which the entirety of the second area A2 and/or the first area A1 is activated, a portion (e.g., the second area A2) of the flexible display 403 may be gradually received in the second housing 402 or be exposed to the outside of the second housing 402. In an embodiment, in a state in which the entirety of the second area A2 and/or the first area A1 is inactivated, a portion (e.g., the second area A2) of the flexible display 403 may be gradually received in the second housing 402 or exposed to the outside of the second housing 402.

According to an embodiment, the electronic device 101 may further include a key input device 441, a connector hole 443, audio modules 445a, 445b, 447a, and 447b, and/or a camera module 449. Although not shown, the electronic device 101 may further include an indicator (e.g., a light emitting diode (LED) device) and/or various sensor modules.

According to an embodiment, the key input device 441 may be disposed on at least one of the first sidewall 413b, the second sidewall 413c, and/or the third sidewall 413d of the first housing 401. Depending on the appearance and the state of use, the electronic device 101 may be designed to omit the illustrated key input device 441 or to include an additional key input device(s). The electronic device 101 may include a key input device (not shown), e.g., a home key or a touchpad disposed around the home key. According to an embodiment, at least a portion of the key input device 441 may be positioned in an area of the first housing 401 and/or the second housing 402.

According to an embodiment, the connector hole (not shown) may receive a connector (e.g., a USB connector) for transmitting and receiving power and/or data with an external electronic device (e.g., the electronic device 102 or 104 of FIG. 1). One or more connector holes may be formed and be formed in at least one of the first sidewall 413b, the second sidewall 413c, or the third sidewall 413d. According to an embodiment, the electronic device 101 may not include the connector hole and, in this case, the electronic device 101 may wirelessly transmit/receive power and/or data to/from the external electronic device.

According to an embodiment, the audio modules 445a, 445b, 447a, and 447b may include speaker holes 445a and 445b and/or microphone holes 447a and 447b. One (e.g., the speaker hole indicated by reference number '445b') of the speaker holes 445a and 445b may be provided as a voice call receiver hole, and the other one (e.g., the speaker hole indicated by reference number '445a') may be provided as an external speaker hole. A microphone may be disposed in the microphone holes 447a and 447b to obtain external sounds. According to an embodiment, there may be a plurality of microphones to be able to detect the direction of a sound. In an embodiment, the speaker hole 445a or 445b and the microphone hole 447a or 447b may be implemented as one hole, or a speaker may be included (e.g., a piezo speaker) without the speaker holes 445a and 445b. According to an embodiment, the speaker holes 445a and 445b and/or the microphone holes 447a and 447b may be disposed in the first housing 401 and/or the second housing 402.

The camera module 449 may be provided on the first housing 401 and may capture a subject in a direction opposite to the first area A1 of the flexible display 403. The electronic device 101 and/or the camera module 449 may include a plurality of cameras. For example, the electronic device 101 and/or the camera module 449 may include a wide-angle camera, a telephoto camera, and/or a close-up camera, and, according to an embodiment, by including an infrared projector and/or an infrared receiver, the electronic device 100 may measure the distance to the subject. The camera module 449 may include one or more lenses, an image sensor, and/or an image signal processor. Although not shown, the electronic device 101 may further include a camera module (e.g., a front camera) that captures the subject in the same direction as the first area A1 of the flexible display 403. For example, the front camera may be disposed around the first area A1 or in an area overlapping the flexible display 403 and, when disposed in the area overlapping the flexible display 403, the front camera may capture the subject through the flexible display 403.

According to an embodiment, an indicator (not shown) of the electronic device 101 may be disposed on the first housing 401 or the second housing 402, and the indicator may include a light emitting diode to provide state information about the electronic device 101 as a visual signal. The sensor module (not shown) (e.g., the sensor module 176 of FIG. 1) of the electronic device 101 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heart rate monitor (HRM) sensor). According to another embodiment, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

The description of the various example embodiments of the disclosure may be applied to swivel-type electronic devices and/or slidable-type electronic devices, as well as foldable-type electronic devices (e.g., the electronic device 101 of FIGS. 3A, 3B, and 3C) or rollable-type electronic devices (e.g., the electronic device 101 of FIGS. 4A and 4B), and the embodiments described in the disclosure may be applied to any electronic device which is transformable. Meanwhile, the structure of the electronic device 101 shown in FIGS. 3A, 3B, and 3C, or FIGS. 4A and 4B is by way of example, and the embodiments described in the disclosure may also be applied to foldable-type or rollable-type electronic devices having various structures.

Figure 5A:
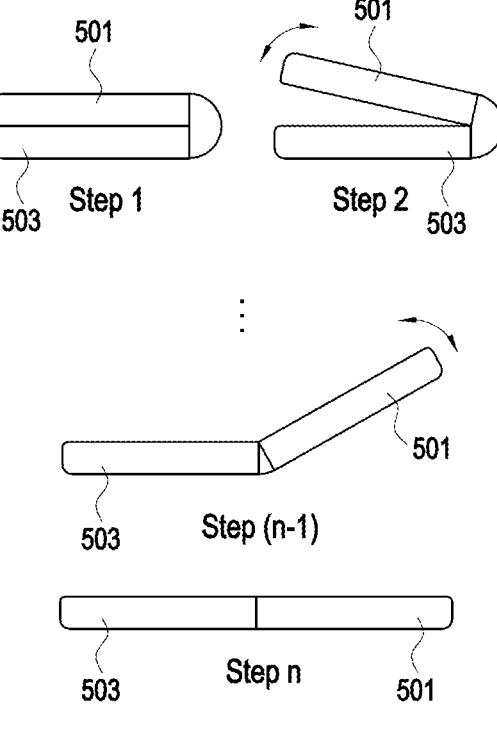
FIG. 5A is a diagram illustrating a view of a state in which a form of a foldable-type electronic device is changed according to an embodiment.

FIG. 5A is a diagram illustrating a view of a state in which a form of a foldable-type electronic device 101 (e.g., the electronic device 101 of FIG. 3A, 3B, and/or 3C) is changed according to an embodiment.

According to an embodiment, the electronic device 101 may include a first housing 501 (e.g., the first housing structure 310) and a second housing 503 (e.g., the second housing structure 320). According to an embodiment, a display (e.g., the display 305 of FIGS. 3A and/or 3B) may be disposed on one surface (e.g., the surface where the first housing 501 and the second housing 503 face each other) of the first housing 501 and/or the second housing 503.

The form of the electronic device 101 in "Step 1" is a state in which the angle between the first housing 501 and the second housing 503 is 0° (or a value substantially close to) 0° and may be described as, e.g., a 'fully folded state' (or 'folded state').

The form of the electronic device 101 in "Step 2" to "Step (n−1)" is a state in which the angle between the first housing 501 and the second housing 503 is more than 0° and less than 180° and may be described as, e.g., an 'intermediate state.' As the value of Step increases, the angle between the first housing 501 and the second housing 503 may increase.

The form of the electronic device 101 in "Step n" is a state in which the angle between the first housing 501 and the second housing 503 is 180° (or a value substantially close to 180°) and may be described as, e.g., a 'fully unfolded state' (or 'unfolded state').

According to an embodiment, the first housing 501 or the second housing 503 may be rotated about one axis (e.g., the folding axis A of FIGS. 3A and/or 3B), so that the form of the electronic device 101 may be changed. For example, if the form of the electronic device 101 is gradually changed from any one Step among "Step 1" to "Step (n−1)" to "Step n" or from any one Step among "Step 2" to "Step n" to "Step 1," the form of the electronic device 101 may be described as changed.

According to an embodiment, when the form of the electronic device 101 is changed into the form corresponding to any one of the above-described Steps, an electrical signal corresponding to the changed form of the electronic device may be transferred from at least one sensor (e.g., the sensor 203 of FIG. 2) to the processor (e.g., the processor 120 of FIG. 1).

According to an embodiment, when the form of the electronic device 101 is changed to "Step 1" or "Step n," an impact sound may be generated due to impact between the first housing 501 and the second housing 503 (or impact between other various structures).

Figure 5B:
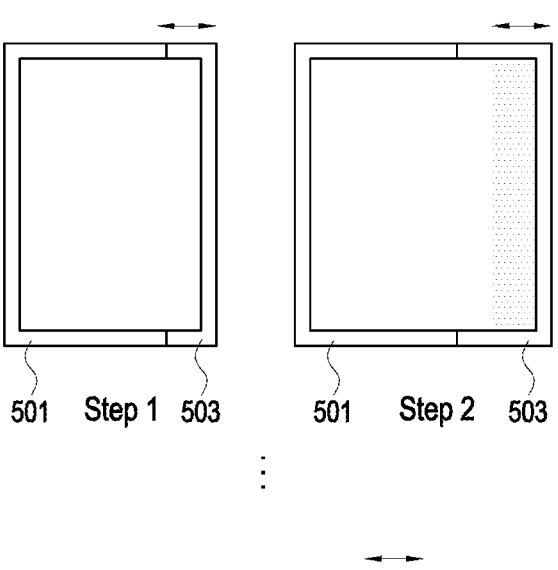
FIG. 5B is a diagram illustrating a view of a state in which a form of a rollable-type electronic device is changed according to an embodiment.
Figure 5B:
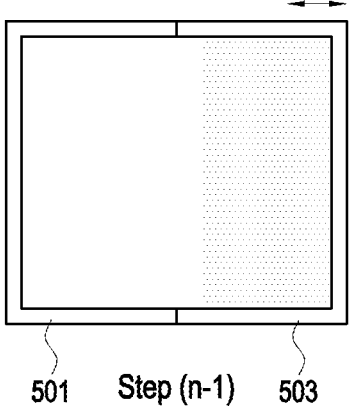
Figure 5B:
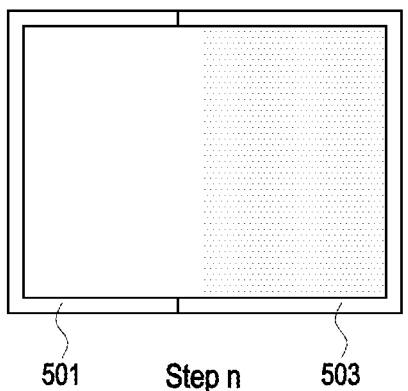

FIG. 5B is a diagram illustrating a view of a state in which a form of a rollable-type electronic device 101 (e.g., the electronic device 101 of FIG. 4A and/or 4B) is changed according to an embodiment.

According to an embodiment, the electronic device 101 may include a first housing 501 (e.g., the first housing 401) and a second housing 503 (e.g., the second housing 402). According to an embodiment, a display (e.g., the flexible display 403 of FIG. 4A and/or 4B) may be disposed on one surface (e.g., the surface facing forward in FIG. 5B) of the first housing 501 and/or the second housing 503. Referring to FIG. 5B, the 'hatched area' denotes the portion, where the externally exposed area is increased according to the extension of the display with respect to the externally exposed area of the display (e.g., the flexible display 403) in "Step 1."

The form of the electronic device 101 in "Step 1" is a state in which the second housing 503 is maximally received in the first housing 501 and may be described as, e.g., a 'closed state.'

The form of the electronic device in "Step 2" to "Step (n−1)" is a state in which the second housing 503 is partially received in the first housing 501 (e.g., a state in which a predetermined portion of the second housing 503 is drawn out from the 'closed state') and may be described as, e.g., an 'intermediate state.' As the value of Step increases, the distance in which the second housing 503 is drawn out from the first housing 501 may increase.

The form of the electronic device 101 in "Step n" is a state in which the second housing 503 is maximally drawn out from the first housing 501 and may be described as, e.g., an 'opened state.'

According to an embodiment, the first housing 501 or the second housing 503 may be moved in a linear direction (e.g., the horizontal direction of FIG. 5B) so that the form of the electronic device 101 may be changed. For example, if the form of the electronic device 101 is gradually changed from any one Step among "Step 1" to "Step (n−1)" to "Step n" or from any one Step among "Step 2" to "Step n" to "Step 1," the form of the electronic device 101 may be described as changed.

According to an embodiment, when the form of the electronic device 101 is changed into the form corresponding to any one of the above-described Steps, an electrical signal corresponding to the changed form of the electronic device may be transferred from at least one sensor (e.g., the sensor 203 of FIG. 2) to the processor (e.g., the processor 120 of FIG. 1).

According to an embodiment, when the form of the electronic device 101 is changed to "Step 1" or "Step n," an impact sound may be generated due to impact between the first housing 501 and the second housing 503 (or impact between other various structures).

Figure 5C:
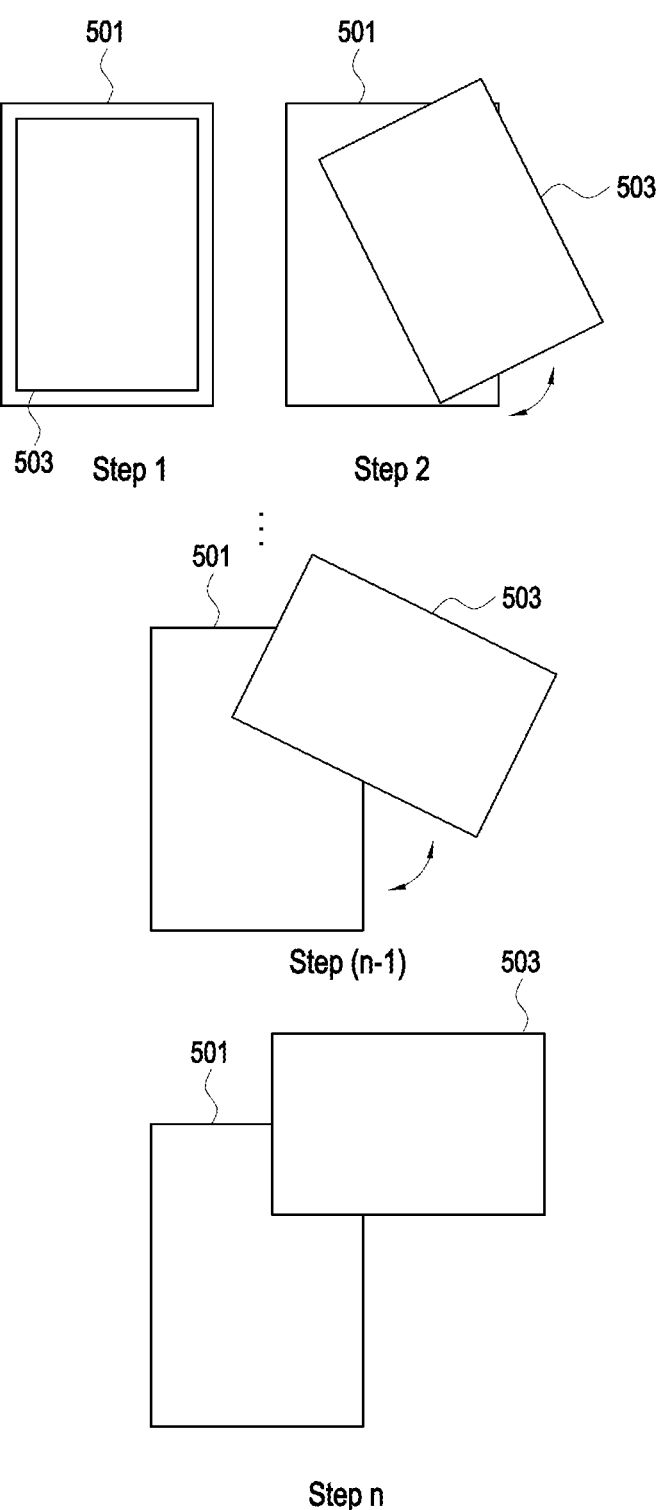
FIG. 5C is a diagram illustrating a view of a state in which a form of a swivel-type electronic device is changed according to an embodiment.

FIG. 5C is a diagram illustrating a view of a state in which a form of a swivel-type electronic device 101 is changed according to an embodiment.

According to an embodiment, the electronic device 101 may include a first housing 501 and a second housing 503. According to an embodiment, a display (e.g., the display module 160 of FIG. 1) may be disposed on one surface (e.g., the surface facing forward in FIG. 5C) of the first housing 501 and/or the second housing 503.

The form of the electronic device 101 in "Step 1" is a state in which the angle between the first housing 501 and the second housing 503 is 0° (or a value substantially close to) 0° and may be described as, e.g., a 'closed state.'

The form of the electronic device 101 in "Step 2" to "Step (n–1)" is a state in which the angle between the first housing 501 and the second housing 503 is more than 0° and less than 90° and may be described as, e.g., an 'intermediate state.' As the value of Step increases, the angle between the first housing 501 and the second housing 503 may increase.

The form of the electronic device 101 in "Step n" is a state in which the angle between the first housing 501 and the second housing 503 is 90° (or a value substantially close to) 90° and may be described as, e.g., an 'opened state').

According to an embodiment, the first housing 501 or the second housing 503 may be rotated about one axis (e.g., one point of the upper portion of the first housing 501 or the second housing 503), so that the electronic device 101 may be transformed. For example, if the form of the electronic device 101 is gradually changed from any one Step among "Step 1" to "Step (n–1)" to "Step n" or from any one Step among "Step 2" to "Step n" to "Step 1," the electronic device 101 may be described as transformed.

According to an embodiment, when the form of the electronic device 101 is changed into the form corresponding to any one of the above-described Steps, an electrical signal corresponding to the changed form of the electronic device may be transferred from at least one sensor (e.g., the sensor 203 of FIG. 2) to the processor (e.g., the processor 120 of FIG. 1).

According to an embodiment, when the form of the electronic device 101 is changed to "Step 1" or "Step n," an impact sound may be generated due to impact between the first housing 501 and the second housing 503 (or impact between other various structures).

Figure 5D:
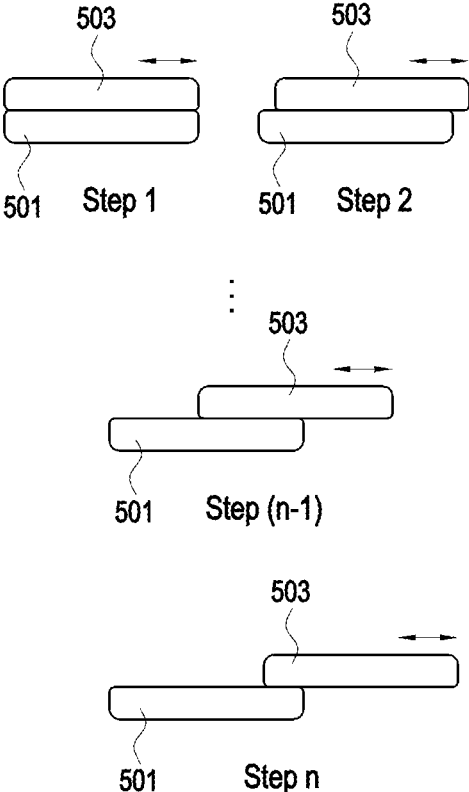
FIG. 5D is a diagram illustrating a view of a state in which a form of a slidable-type electronic device is changed according to an embodiment.

FIG. 5D is a diagram illustrating a view of a state in which a form of a slidable-type electronic device 101 is changed according to an embodiment.

According to an embodiment, the electronic device 101 may include a first housing 501 and a second housing 503. According to an embodiment, a display (e.g., the display module 160 of FIG. 1) may be disposed on one surface (e.g., the surface facing upward in FIG. 5D) of the first housing 501 and/or the second housing 503.

The form of the electronic device 101 in "Step 1" is a state in which the second housing 503 maximally overlaps the first housing 501 and may be described as, e.g., a 'closed state.'

The form of the electronic device in "Step 2" to "Step (n–1)" is a state in which the second housing 503 overlaps a portion of the first housing 501 (e.g., a state in which the second housing 503 is moved by a predetermined distance from the 'closed state') and may be described as, e.g., an 'intermediate state.' As the value of Step decreases, the portion where the second housing 503 overlaps the first housing 501 may broaden.

The form of the electronic device 101 in "Step n" is a state in which the second housing 503 is maximally moved from the first housing 501 and may be described as, e.g., an 'opened state.'

According to an embodiment, the first housing 501 or the second housing 503 may be moved in a linear direction (e.g., the horizontal direction of FIG. 5D) so that a form of the electronic device 101 may be changed. For example, if the form of the electronic device 101 is gradually changed from any one Step among "Step 1" to "Step (n–1)" to "Step n" or from any one Step among "Step 2" to "Step n" to "Step 1," a form of the electronic device 101 may be described as changed.

According to an embodiment, when the form of the electronic device 101 is changed into the form corresponding to any one of the above-described Steps, an electrical signal corresponding to the changed form of the electronic device may be transferred from at least one sensor (e.g., the sensor 203 of FIG. 2) to the processor (e.g., the processor 120 of FIG. 1).

According to an embodiment, when the form of the electronic device 101 is changed to "Step 1" or "Step n," an impact sound may be generated due to impact between the first housing 501 and the second housing 503 (or impact between other various structures).

Figure 6:
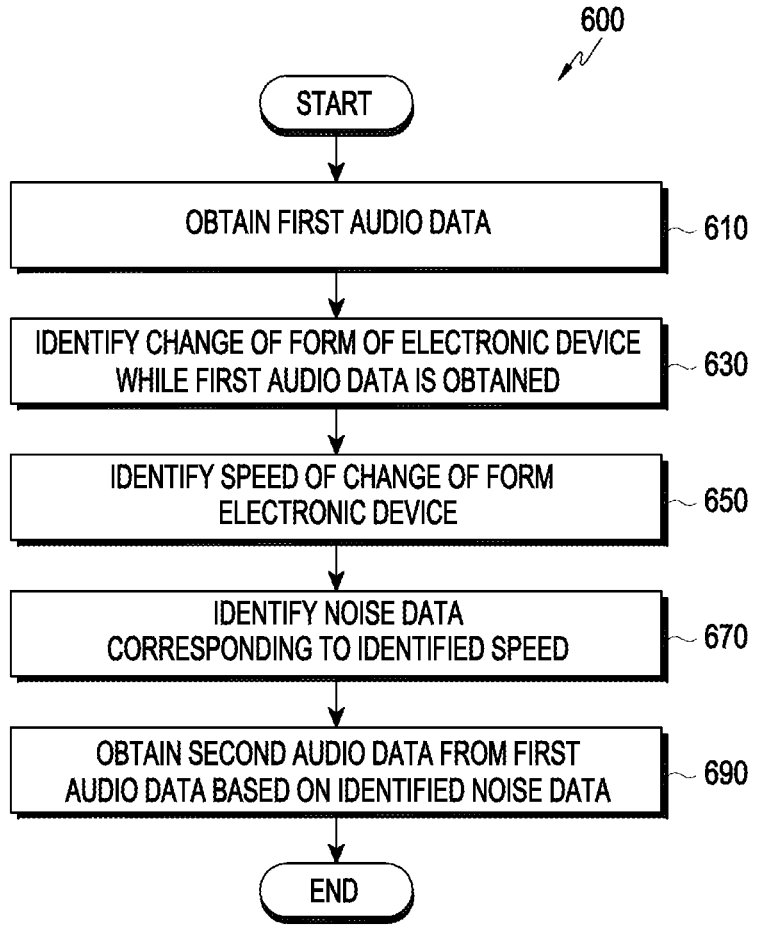
FIG. 6 is a flowchart illustrating an example method for performing noise processing on audio data based on a change of a form of an electronic device by the electronic device according to an embodiment.

FIG. 6 is a flowchart 600 illustrating an example method for performing noise processing on audio data based on a change of a form of an electronic device 101 by the electronic device (e.g., the electronic device 101 of FIG. 1) according to an embodiment.

According to an embodiment, in operation 610, the electronic device 101 may obtain first audio data. For example, the electronic device 101 may obtain the first audio data using at least one microphone (e.g., the microphone 201 of FIG. 2A and/or 2B).

According to an embodiment, in operation 630, the electronic device 101 may identify that the form of the electronic device 101 is changed while obtaining the first audio data. For example, the electronic device 101 may receive an electrical signal (e.g., first signal and/or second signal) corresponding to the changed form (e.g., indicating the changed form) from at least one sensor (e.g., the sensor 203 of FIG. 2A and/or 2B) if the form of the electronic device 101 is changed (e.g., change from any one Step among Steps of FIG. 5A, 5B, 5C, and/or 5D to another Step) according to a relative movement (e.g., rotational movement and/or linear movement) of the first housing (e.g., the first housing 501 of FIG. 5A, 5B, 5C, and/or 5D) and the second housing (e.g., the second housing 503 of FIG. 5A, 5B, 5C, and/or 5D). The electronic device 101 may identify that the form of the electronic device 101 is changed based on reception of an electrical signal from at least one sensor (e.g., the sensor 203).

According to an embodiment, in operation 650, the electronic device 101 may identify the speed of a change of a form of the electronic device 101. For example, the electronic device 101 may identify the speed of a change of a form of the electronic device 101 based on the difference between the times of reception of electrical signals from at least one sensor (e.g., the sensor 203) and this is described below in greater detail. According to an embodiment, in operation 670, the electronic device 101 may identify noise data corresponding to the speed of a change of a form of the electronic device 101 (e.g., the speed of transformation in Table 1) among noise data (e.g., the mapping table in the form of Table 1) pre-stored in the memory (e.g., the memory 130 of FIG. 1). According to an embodiment, the electronic device 101 may also identify noise data corresponding to the changed form (e.g., Step 1 or Step n) of the electronic device 101 and the speed of a change of a form of the electronic device 101 (e.g., the time of a change of a form and/or the speed of a change of a form in Table 1) among the pre-stored noise data. According to an embodiment, the electronic device 101 does not identify the speed of a change of a form of the electronic device 101, but may identify the difference between the times of reception of the electrical signals and then perform the operations described below. According to an embodiment, the electronic device 101 may identify the noise data corresponding to the identified difference between the times of reception of the electrical signals. According to an embodiment, upon receiving the electrical signal corresponding to the changed form of the electronic device 101 from at least one sensor (e.g., the sensor 203), the electronic device 101 may identify the changed form of the electronic device 101 based thereon and identify the noise data corresponding to the changed form of the electronic device 101, which is described below in greater detail. For example, the electronic device 101 may identify noise data corresponding to the changed form (e.g., Step 1 or Step n) of the electronic device 101 among pre-stored noise data.

According to an embodiment, in operation 690, the electronic device 101 may obtain second audio data from the first audio data based on the identified noise data. For example, the electronic device 101 may perform noise processing (e.g., noise reducing or noise canceling) on the first audio data based on the identified noise data, obtaining second audio data with reduced (or removed) noise which is caused as the form of the electronic device 101 is changed.

Figure 7:
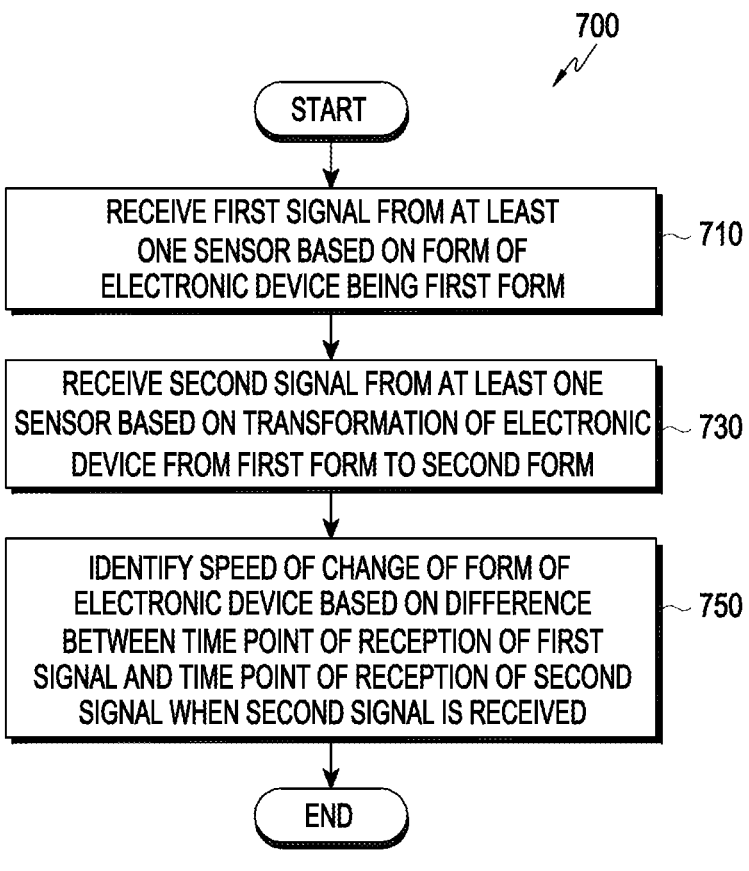
FIG. 7 is a flowchart illustrating an example method for identifying a speed at which a form of an electronic device is changed by the electronic device according to an embodiment.

FIG. 7 is a flowchart 700 illustrating an example method for identifying a speed at which a form of an electronic device 101 is changed by the electronic device (e.g., the electronic device 101 of FIG. 1) according to an embodiment.

According to an embodiment, in operation 710, the electronic device 101 may receive a first signal (e.g., the electrical signal received from the sensor 203 of FIG. 2A and/or 2B) from at least one sensor (e.g., the sensor 203 of FIG. 2) based on the form of the electronic device 101 being a first form. For example, the first form may be a form corresponding to any one of Step 2 to Step (n–1) of FIG. 5A, 5B, 5C, and/or 5D. For example, the first signal is an electrical signal received from at least one sensor (e.g., the sensor 203) when the form of the electronic device 101 is the first form and may include the Step value indicating the first form.

According to an embodiment, in operation 730, the electronic device 101 may receive a second signal from the at least one sensor (e.g., the sensor 203) based on a change of the form of the electronic device 101 from the first form to the second form. For example, the second form may be a form corresponding to any one of Step 1 to Step n of FIG. 5A, 5B, 5C, and/or 5D. For example, the second signal is an electrical signal received from at least one sensor (e.g., the sensor 203) when the form of the electronic device 101 is the second form and may include the Step value indicating the second form.

According to an embodiment, in operation 750, the electronic device 101 may identify the speed of a change of the form of the electronic device 101 based on the difference between the time point of reception of the first signal and the time point of reception of the second signal when the second signal is received. For example, upon receiving the second signal a predetermined time t after the first signal is received, the electronic device 101 may identify the difference $t_f$ between the time point of reception of the first signal and the time point of reception of the second signal. As an example, upon identifying that the form of the electronic device 101 is changed into Step 1 (or Step n) of FIG. 5A, 5B, 5C, and/or 5D, the electronic device 101 may identify the speed of a change of the form of the electronic device 101 (e.g., $v_f$ of Table 1) based on the difference (e.g., $t_f$ of Table 1) between the time point of reception of the first signal from the at least one sensor (e.g., the sensor 203) and the time point of reception of the second signal from the at least one sensor (e.g., the sensor 203) based on the previous Step being Step 2 (or Step (n–1)). According to an embodiment, the electronic device 101 may identify the noise data corresponding thereto based on the time difference $t_f$.

Figure 8:
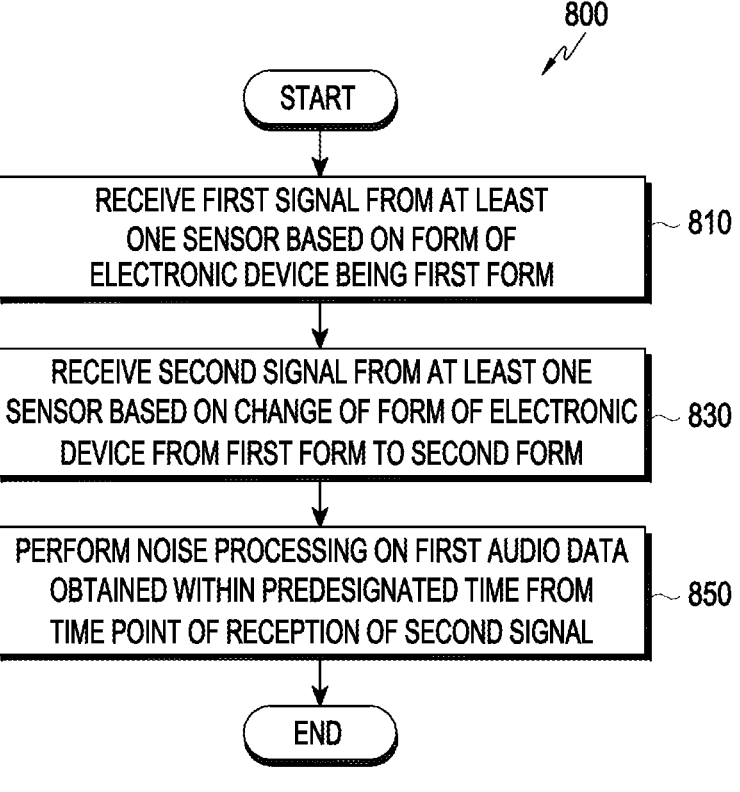
FIG. 8 is a flowchart illustrating an example method for performing noise processing on audio data based on a speed at which a form of an electronic device is changed by the electronic device according to an embodiment.

FIG. 8 is a flowchart 800 illustrating an example method for performing noise processing on audio data based on a speed at which a form of an electronic device 101 is changed by the electronic device (e.g., the electronic device 101 of FIG. 1) according to an embodiment. No duplicate description is presented below of those operations described above in connection with FIG. 7.

According to an embodiment, in operation 810, the electronic device 101 may receive a first signal (e.g., the electrical signal received from the sensor 203 of FIG. 2A and/or 2B) from at least one sensor (e.g., the sensor 203 of FIG. 2) based on the form of the electronic device 101 being a first form.

According to an embodiment, in operation 830, the electronic device 101 may receive a second signal from the at least one sensor (e.g., the sensor 203) based on a change of the form of the electronic device 101 from the first form to the second form.

According to an embodiment, in operation 850, the electronic device 101 may perform noise processing on the first audio data obtained within a predesignated time from the time point of reception of the second signal. Referring to FIG. 2A and/or 2B together, the time point of reception of the second signal from at least one sensor (e.g., the sensor 203 of FIG. 2) by the audio module 170 (e.g., the DSP 207 of FIG. 2B) (or the processor 120 of FIG. 2A) may be the time point of a change of the form of the electronic device 101 into the second form and be the time when impact sound is generated (e.g., expected to be generated) due to the change of the form of the electronic device 101. While the audio signal output from the microphone 201 is transferred to the audio module 170 (e.g., the DSP 207 of FIG. 2B) (or the processor 120 of FIG. 2A), a predetermined delay (e.g., a delay caused during the analog-digital converting process by the A/D converter 205) may occur. Thus, a predetermined time (e.g., the delay time) after the second signal is received, the first audio data transferred to the DSP 207 or the processor 120 may be the data recording the external voice influenced by the above-described impact sound. Upon receiving the second signal, the audio module 170 (e.g., the DSP 207 of FIG. 2B) (or the processor 120 of FIG. 2A) may perform noise processing on the first audio data obtained within a predesignated time from the time point of reception of the second signal. For example, the predesignated time may be set based on the above-described predetermined time (e.g., the delay time). As an example, the predesignated time may be set to be longer than the time (e.g., buffer size) of converting the audio signal by the A/D converter 205.

Figure 9:
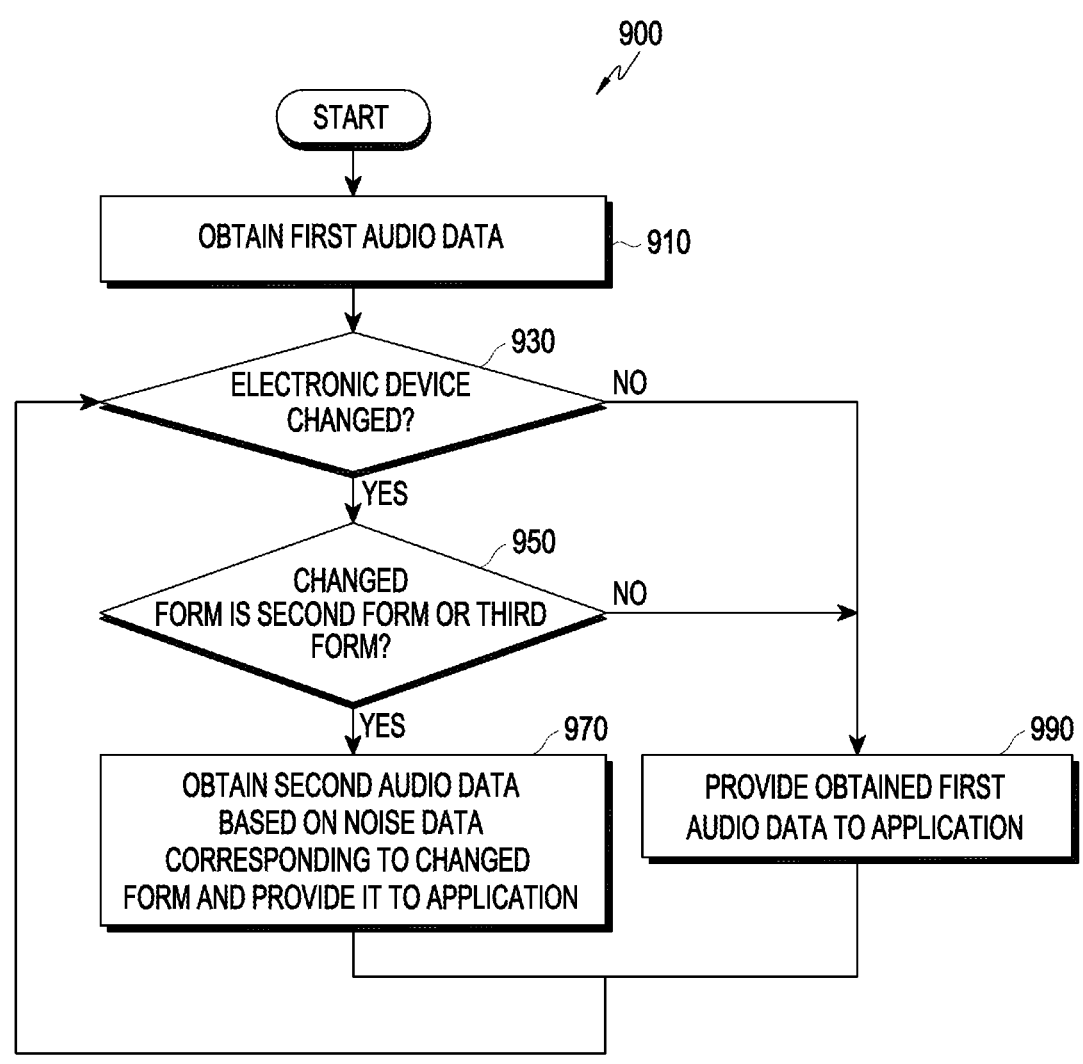
FIG. 9 is a flowchart illustrating an example method for providing audio data to an application based on whether a form of an electronic device is changed by the electronic device according to an embodiment.

FIG. 9 is a flowchart 900 illustrating an example method for providing audio data to an application based on whether a form of an electronic device (e.g., the electronic device 101 of FIG. 1) by the electronic device, is changed according to an embodiment.

According to an embodiment, in operation 910, the electronic device 101 may obtain first audio data.

According to an embodiment, in operation 930, the electronic device 101 may identify whether a form of the electronic device 101 is changed.

According to an embodiment, upon identifying that the form of the electronic device 101 is changed, the electronic device 101 may identify whether the changed form is a second form or a third form in operation 950. In this drawings, for convenience of description, the second form is described as being a form corresponding to "Step 1" of FIG. 5A, 5B, 5C, and/or 5D, and the third form is described as being a form corresponding to "Step n" of FIG. 5A, 5B, 5C, and/or 5D.

According to an embodiment, upon identifying that the changed form is the second form or the third form, the electronic device 101 may obtain second audio data based on the noise data corresponding to the changed form and provide it to an application in operation 970. For example, upon identifying that the changed form is the second form, the electronic device 101 may provide the application with second audio data obtained by performing noise processing on the first audio data based on the noise data (e.g., any one of reference $a_1$, $a_2$, and $a_3$ of Table 1) corresponding to the second form. For example, upon identifying that the changed form is the third form, the electronic device 101 may provide the application with second audio data obtained by performing noise processing on the first audio data based on the noise data (e.g., any one of reference $b_1$, $b_3$, and $b_3$ of Table 1) corresponding to the third form. According to an embodiment, the noise data corresponding to the changed form may also be identified based on the time point of a change of the form (or speed of the change of the form) of the electronic device 101. For example, upon identifying that the changed form of the electronic device 101 is the second form, the electronic device 101 may identify the time $t_f$ of a change of the form (or speed $v_f$ of a change of the form) of the electronic device 101 into the second form and perform noise processing on the first audio data using the noise data corresponding to the changed form (e.g., current form) and time $t_f$ of transformation (or speed $v_f$ of transformation).

According to an embodiment, upon identifying that the form of the electronic device 101 is not changed (no in operation 930) or that the changed form is not the second form or third form (no in operation 950) (e.g., when the changed form is in the 'intermediate state' of FIG. 5A, 5B, 5C, and/or 5D), the electronic device 101 may provide the obtained first audio data to the application in operation 990. For example, the electronic device 101 may provide the first audio data to the application without performing noise processing on the obtained first audio data based on noise data.

According to an embodiment, the electronic device 101 may perform operation 970 or 990 and then perform operation 930 again, again identifying whether the form of the electronic device 101 is changed while obtaining the first audio data.

Figure 10:
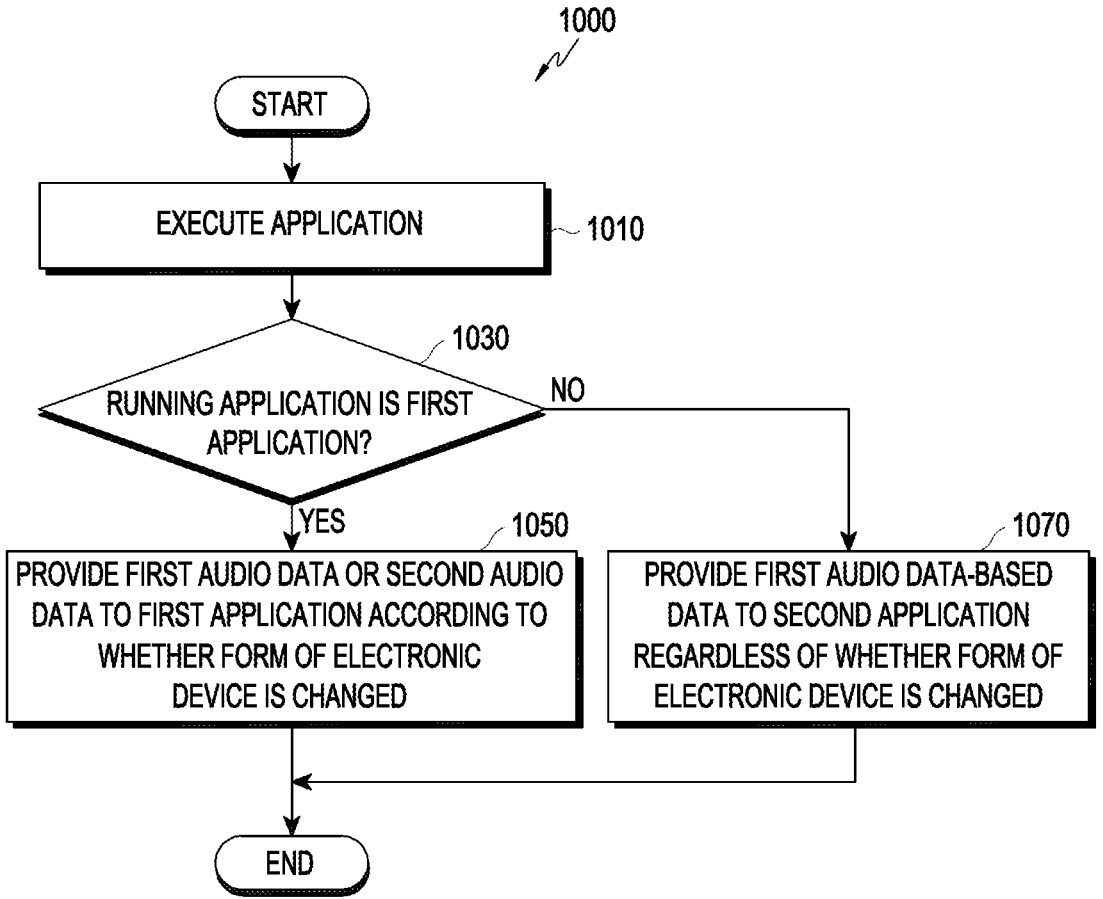
FIG. 10 is a flowchart illustrating an example method for providing audio data to an application based on a running application by an electronic device according to an embodiment.

FIG. 10 is a flowchart 1000 illustrating an example method for providing audio data to an application based on a running application by an electronic device 101 according to an embodiment.

According to an embodiment, in operation 1010, the electronic device 101 may execute an application. According to an embodiment, the executed application may be an application that uses the external voice detected through at least one microphone (e.g., the microphone 201 of FIG. 2).

According to an embodiment, in operation 1030, the electronic device 101 may identify whether the running application is a first application. For example, the first application may be an application that converts the detected external voice into data and stores it in the memory 130, such as a recording application or a camera application. According to an embodiment, the first application may also include, e.g., a call application that converts the detected external voice or sound into data and transmits it to the external network.

According to an embodiment, if the running application is identified to be the first application, the electronic device 101 may provide the first audio data or second audio data to the first application according to whether the form of the electronic device 101 is changed in operation 1050. For example, referring to FIG. 9 together, the electronic device 101 may perform operation 930 (e.g., identifying whether the form of the electronic device 101 is changed), performing operation 950, 970, and/or 990.

According to an embodiment, upon identifying that the running application is not the first application, the electronic device 101 may provide first audio data-based data to the running application regardless of whether the form of the electronic device 101 is changed in operation 1070. For example, when the running application is a second area A2 that mainly uses the user's voice among external voices, such as a call application, the electronic device 101 may obtain data for the user's voice extracted by applying VAD or other various user voice extraction techniques to the first audio data and provide it to the second application regardless of whether the form of the electronic device 101 is changed (e.g., without identifying whether the form of the electronic device 101 is changed). As another example, when the running application is a third application different from the above-described first application and second application, the first audio data may be bypassed and provided to the third application.

Figure 11:
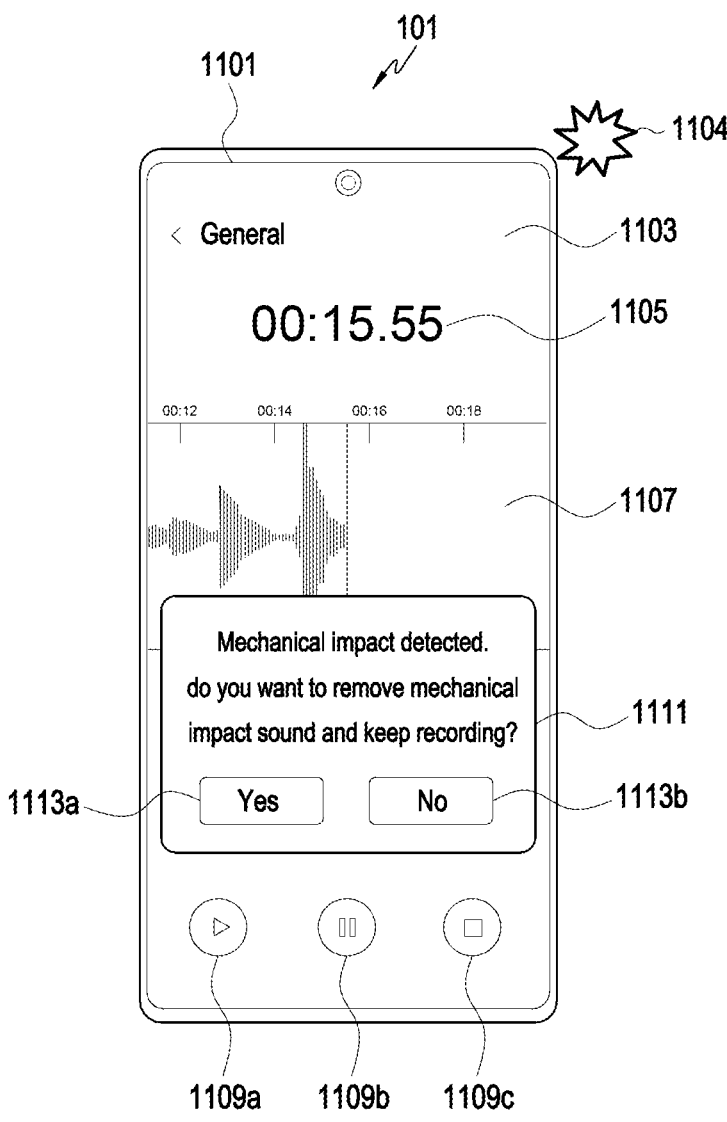
FIG. 11 illustrates an example of a screen displayed on a display when a form of an electronic device is changed according to an embodiment.

FIG. 11 illustrates an example of a screen displayed on a display 1101 (e.g., the display module 160 of FIG. 1) when a form of an electronic device 101 (e.g., the rollable-type electronic device 101 of FIG. 4A and/or 4B) is changed according to an embodiment.

According to an embodiment, whether to perform noise processing based on the noise data (e.g., reference data) described above in connection with the drawings may be set previously (e.g., before detecting the external voice through the recording application). For example, the electronic device 101 may perform noise processing based on noise data to obtain and provide second audio data when the form of the electronic device 101 is changed or may obtain and provide first audio data without performing noise processing based on the noise data regardless of the change of the form of the electronic device 101, according to the user's settings.

According to an embodiment, whether to perform noise processing based on the noise data (e.g., reference data) described above in connection with the drawings may also be set (or changed) after the recording application (e.g., the first application) is executed.

Referring to FIG. 11, when the recording application (e.g., the first application) is running, the execution screen 1103 of the recording application may be displayed on the display 1101. In this case, the electronic device 101 may be detecting external voice using the microphone (e.g., the microphone 201 of FIG. 2A and/or 2B) to convert the detected external voice into data and store it using the recording application.

According to an embodiment, the execution screen 1103 of the recording application may include various pieces of information related to the recording application. For example, the execution screen 1103 may include information 1105 about the recording time (e.g., elapsed time after the recording function is executed) of the recording application and/or information 1107 about the waveform related to the recorded voice (e.g., waveform indicating the magnitude of the recorded voice). According to an embodiment, the execution screen 1103 may include icons related to the functions of the recording application. For example, the execution screen 1103 may include a first icon 1109*a* for providing a recording start function, a second icon 1109*b* for providing a recording pause function, and/or a third icon 1109*c* for providing a recording stop function.

According to an embodiment, the form of the electronic device 101 may be changed according to a relative movement of the first housing (e.g., the first housing 501 of FIG. 5B) and the second housing (e.g., the second housing 503 of FIG. 5B) of the electronic device 101. The form of the electronic device 101 shown in FIG. 11 may be a form corresponding to Step 1 of FIG. 5B. According to an embodiment, if the form of the electronic device 101 is changed into the second form (e.g., the form corresponding to Step 1 of FIG. 5B) according to a relative movement of the first housing 501 and the second housing 503 of the electronic device 101, a mechanical impact sound 1104 may be generated due to impact between the structures (e.g., the first housing 501 and the second housing 503) in the electronic device 101. According to an embodiment, the electronic device 101 may provide a user interface for allowing the user to set (or change) to perform noise data (e.g., reference data)-based noise processing if identifying that the form of the electronic device 101 is changed into the second form when it is set not to perform noise data (e.g., reference data)-based noise processing or when it is not previously set whether to perform noise data (e.g., reference data)-based noise processing. For example, referring to FIG. 11, upon identifying that the form of the electronic device 101 is changed into the second form, the electronic device 101 may display a user interface (e.g., a notification message 1111) in a popup form. According to an embodiment, the displayed user interface (e.g., the notification message 1111) may include information (e.g., "Mechanical impact has been detected. Do you want to remove the mechanical impact and keep recording?") indicating that mechanical impact sound may be included during voice recording. According to an embodiment, the displayed user interface (e.g., the notification message 1111) may include a confirm button 1113*a* and/or a reject button 1113*b*. According to an embodiment, if the confirm button 1113*a* is selected (e.g., touched) by the user, the electronic device 101 may perform noise data (e.g., reference data)-based noise processing on the audio data (e.g., first audio data) obtained before or after the time of a change of the form of the electronic device 101 into the second form or the time of selection of the confirm button 1113*a* by the user, obtaining the second audio data and providing the second audio data to the recording application. According to an embodiment, if the reject button 1113*b* is selected (e.g., touched) by the user, the electronic device 101 may bypass (e.g., without performing noise data (e.g., reference data)-based noise processing) the audio data (e.g., first audio data) obtained before or after the time of a change of the form of the electronic device 101 into the second form or the time of selection of the confirm button 1113*a* by the user and provide it to the recording application.

According to an embodiment, an electronic device (e.g., the electronic device 101 of FIG. 1) may include a first housing (e.g., the first housing 501 FIG. 5A, 5B, 5C, or 5D), a second housing (e.g., the second housing 503 of FIG. 5A, 5B, 5C, or 5D) connected with at least a portion of the first housing and movable with respect to the first housing, at least one display (e.g., the display module 160 of FIG. 1) coupled with at least one of the first housing or the second housing, at least one microphone (e.g., the microphone 201 of FIG. 2A and/or 2B), at least one sensor (e.g., the sensor 203 of FIG. 2A and/or 2B), and at least one processor (e.g., the processor 120 of FIG. 1). The at least one processor may be configured to obtain first audio data, using the at least one microphone, identify that a form of the electronic device is changed according to a relative movement of the first housing and the second housing, using the at least one sensor, while the first audio data is obtained, identify noise data based on identifying that the form of the electronic device is changed, and obtain second audio data from the first audio data, based on the identified noise data. The second audio data may include data in which at least a portion of noise, which is generated based on a change of the form of the electronic device and included in the first audio data, is reduced or canceled.

According to an embodiment, the at least one processor may be further configured to receive a first signal from the at least one sensor, based on the form of the electronic device being a first form, and receive a second signal from the at least one sensor, based on the form of the electronic device from the first form to a second form.

According to an embodiment, the at least one processor may be configured to identify a speed of a change of the form of the electronic device, based on a difference between a time point of reception of the first signal and a time point of reception of the second signal when the second signal is received, and identify the noise data corresponding to the identified speed.

According to an embodiment, the at least one processor may be configured to perform noise processing based on the identified noise data on the first audio data obtained within a predesignated time from a time point of reception of the second signal.

According to an embodiment, the at least one processor may be configured to identify first noise data as the noise data, based on a change of the form of the electronic device into a second form, and identify second noise data as the noise data, based on a change of the form of the electronic device into a third form. The first noise data and the second noise data may differ from each other.

According to an embodiment, the electronic device may further comprise a memory. A plurality of noise data may be pre-stored in the memory. Each of the plurality of pre-stored noise data may include information about a noise pattern corresponding to at least one of a speed of a change of the form of the electronic device or a changed form of the electronic device. Any one of the plurality of pre-stored noise data may be identified as the noise data.

According to an embodiment, the at least one processor may be further configured to provide the first audio data to an application, based on identifying that the form of the electronic device is not changed, and provide the second audio data to the application, based on identifying that the form of the electronic device is changed.

According to an embodiment, the at least one processor may be further configured to execute an application, if the executed application is a first application, provide the first audio data or the second audio data to the first application according to whether the form of the electronic device is changed, and, if the executed application is a second application, provide the first audio data-based data to the second application regardless of whether the form of the electronic device is changed.

According to an embodiment, the at least one processor may include a DSP and/or an AP. The DSP may be configured to transfer at least one audio data of the first audio data or the second audio data to a buffer of the AP. The AP may be configured to provide the at least one audio data transferred to the buffer to an application running on the electronic device.

According to an embodiment, the second housing may be hinge-coupled with at least a portion of the first housing.

According to an embodiment, a method for controlling an electronic device may include obtaining first audio data, using at least one microphone of the electronic device, identifying that a form of the electronic device is changed according to a relative movement of a first housing of the electronic device and a second housing of the electronic device, using at least one sensor of the electronic device, while the first audio data is obtained, identifying noise data based on identifying that the form of the electronic device is changed, and obtaining second audio data from the first audio data, based on the identified noise data. The second audio data may include data in which at least a portion of noise, which is generated based on a change of the form of the electronic device and included in the first audio data, is reduced or canceled.

According to an embodiment, the method of controlling the electronic device may further comprise receiving a first signal from the at least one sensor, based on the form of the electronic device being a first form and receiving a second signal from the at least one sensor, based on a change of the form of the electronic device from the first form to a second form.

According to an embodiment, identifying the noise data, based on identifying that the form of the electronic device is changed, may include identifying a speed of a change of the form of the electronic device, based on a difference between a time point of reception of the first signal and a time of reception of the second signal when the second signal is received, and identifying the noise data corresponding to the identified speed.

According to an embodiment, obtaining the second audio data from the first audio data, based on the identified noise data, may include performing noise processing based on the identified noise data on the first audio data obtained within a predesignated time point from a time of reception of the second signal.

According to an embodiment, identifying the noise data, based on identifying that the form of the electronic device is changed, may include identifying first noise data as the noise data, based on a change of the form of the electronic device into a second form and identifying second noise data as the noise data, based on a change of the form of the electronic device into a third form. The first noise data and the second noise data may differ from each other.

According to an embodiment, the electronic device may further comprise a memory. A plurality of noise data may be pre-stored in the memory. Each of the plurality of pre-stored noise data may include information about a noise pattern corresponding to at least one of a speed of a change of the form of the electronic device or a changed form of the electronic device. Any one of the plurality of pre-stored noise data may be identified as the noise data.

According to an embodiment, the method of controlling the electronic device may further comprise providing the first audio data to an application, based on identifying that the form of the electronic device is not changed, and providing the second audio data to the application, based on identifying that the form of the electronic device is changed.

According to an embodiment, the method of controlling the electronic device may further comprise executing an application, if the executed application is a first application, providing the first audio data or the second audio data to the first application according to whether the form of the electronic device is changed, and if the executed application is a second application, providing the first audio data-based data to the second application regardless of whether the form of the electronic device is changed.

According to an embodiment, the method of controlling the electronic device may further comprise transferring at least one audio data of first audio data or second audio data to a buffer of an AP of the electronic device and providing the at least one audio data transferred to the buffer to an application running on the electronic device.

According to an embodiment, a non-transitory computer-readable non-volatile recording medium may store instructions that, when executed, enable at least one processor of an electronic device to obtain first audio data, using at least one microphone of the electronic device, identify that a form of the electronic device is changed according to a relative movement of a first housing of the electronic device and a second housing of the electronic device, using at least one sensor of the electronic device, while the first audio data is obtained, identify noise data based on identifying that the form of the electronic device is changed, and obtain second audio data from the first audio data, based on the identified noise data. The second audio data may include data in which at least a portion of noise, which is generated based on a change of the form of the electronic device and included in the first audio data, is reduced or canceled.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

As used herein, such terms as "1st" and "2nd," or "first" and "second" may be used to simply distinguish a corresponding component from another, and do not limit the components in other aspects (e.g., importance or order). If an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" may simply refer, for example, to the storage medium being a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first housing;
a second housing connected with at least a portion of the first housing and movable with respect to the first housing;
at least one display coupled with at least one of the first housing or the second housing;
at least one microphone;
at least one sensor; and
at least one processor comprising processing circuitry, wherein the at least one processor is configured, individually or collectively, to:
obtain first audio data, using the at least one microphone,
identify that a form of the electronic device is changed according to a relative movement of the first housing and the second housing, using the at least one sensor, while the first audio data is obtained,
based on identifying that the form of the electronic device changes, identify noise data for reducing noise generated from mechanical structures of the electronic device by the changing of the form, and
obtain second audio data from the first audio data, based on the identified noise data.

2. The electronic device of claim 1, wherein at least one processor comprising processing circuitry is configured individually or collectively to:
receive a first signal from the at least one sensor, based on the form of the electronic device being a first form, and
receive a second signal from the at least one sensor, based on a change of the form of the electronic device from the first form to a second form.

3. The electronic device of claim 2, wherein at least one processor comprising processing circuitry is configured individually or collectively to:
identify a speed of a change of the form of the electronic device, based on a difference between a time point of reception of the first signal and a time point of reception of the second signal when the second signal is received, and
identify, as the noise data, noise data corresponding to the identified speed.

4. The electronic device of claim 2, wherein at least one processor comprising processing circuitry is configured individually or collectively to perform noise processing, based on the identified noise data, on portions of the first audio data obtained within a specified time from a time point of reception of the second signal.

5. The electronic device of claim 1, wherein at least one processor comprising processing circuitry is configured individually or collectively to:

identify, as the noise data, first noise data, based on change of the form of the electronic device into a second form, and identify, as the noise data, second noise data, based on change of the form of the electronic device into a third form, and wherein the first noise data and the second noise data differ from each other.

6. The electronic device of claim 1, wherein at least one processor comprising processing circuitry is configured individually or collectively to:

provide the first audio data to an application, based on identifying that the form of the electronic device is not changed, and provide the second audio data to the application, based on identifying that the form of the electronic device is changed.

7. The electronic device of claim 1, wherein at least one processor comprising processing circuitry is configured individually or collectively to:

execute an application, based on the executed application being a first application, provide the first audio data or the second audio data to the first application according to whether the form of the electronic device is changed, and based on the executed application being a second application different from the first application, provide the first audio data-based data to the second application regardless of whether the form of the electronic device is changed.

8. The electronic device of claim 1, wherein at least one processor comprising processing circuitry includes a digital signal processor (DSP) and an application processor (AP), wherein the DSP is configured to transfer at least one of the first audio data or the second audio data to a buffer of the AP, and wherein the AP is configured to provide the at least one audio data transferred to the buffer to an application running on the electronic device.

9. The electronic device of claim 1, wherein the second housing is hinge-coupled with at least a portion of the first housing.

10. A method for controlling an electronic device, the method comprising:

obtaining first audio data, using at least one microphone of the electronic device;

identifying that a form of the electronic device is changed according to a relative movement of a first housing of the electronic device and a second housing of the electronic device, using at least one sensor of the electronic device, while the first audio data is obtained;

based on identifying that the form of the electronic device is changed, identifying noise data for reducing noise generated from mechanical structures of the electronic device by the changing of the form; and obtaining second audio data from the first audio data, based on the identified noise data.

11. The method of claim 10, further comprising:

receiving a first signal from the at least one sensor, based on the form of the electronic device being a first form; and receiving a second signal from the at least one sensor, based on a change of the form of the electronic device from the first form to a second form.

12. The method of claim 11, further comprising:

identifying a speed of a change of the form of the electronic device, based on a difference between a time point of reception of the first signal and a time point of reception of the second signal when the second signal is received; and identifying, as the noise data, noise data corresponding to the identified speed.

13. The method of claim 11, further comprising performing noise processing, based on the identified noise data, on portions of the first audio data obtained within a specified time point from a time of reception of the second signal.

14. The method of claim 10, further comprising:

identifying, as the noise data, first noise data, based on a change of the form of the electronic device into a second form; and identifying, as the noise data, second noise data, based on a change of the form of the electronic device into a third form, and wherein the first noise data and the second noise data differ from each other.

15. The method of claim 10, further comprising:

wherein a plurality of noise data are pre-stored in a memory of the electronic device, wherein each of the plurality of pre-stored noise data includes information about a noise pattern corresponding to at least one of a speed of a change of the form of the electronic device or a changed form of the electronic device, and wherein the identified noise data comprises any one of the plurality of pre-stored noise data.

16. The method of claim 10, further comprising:

providing the first audio data to an application, based on identifying that the form of the electronic device is not changed, and providing the second audio data to the application, based on identifying that the form of the electronic device is changed.

17. The method of claim 10, further comprising:

executing an application, based on the executed application being a first application, providing the first audio data or the second audio data to the first application according to whether the form of the electronic device is changed, and based on the executed application being a second application different from the first application, providing the first audio data-based data to the second application regardless of whether the form of the electronic device is changed.

18. The method of claim 10, further comprising:

transferring at least one of the first audio data or the second audio data to a buffer of an application processor (AP) of the electronic device, providing the at least one audio data transferred to the buffer to an application running on the electronic device.

19. A non-transitory computer-readable storage medium storing instructions which, when executed by at least one processor of an electronic device, configure to enable the electronic device to perform at least one operation, the at least one operation comprising:

obtaining first audio data, using at least one microphone, identifying that a form of the electronic device is changed according to a relative movement of a first housing and a second housing, using at least one sensor, while the first audio data is obtained, based on identifying that the form of the electronic device is changed, identifying noise data for reducing noise generated from mechanical structures of the electronic device by the changing of the form, and obtaining second audio data from the first audio data, based on the identified noise data.

20. An electronic device comprising:

a first housing;

a second housing slidably coupled to the first housing;

a flexible display coupled to first housing and the second housing and configured to change size as the second housing slides;

at least one microphone;

at least one sensor;

at least one processor comprising processing circuitry; and memory, wherein a plurality of noise data are pre-stored in the memory, wherein each of the plurality of pre-stored noise data includes information about a noise pattern corresponding to a speed of a change of a form of the electronic device and a changed form of the electronic device, and wherein the memory storing instructions that, when executed by the at least one processor, cause the electronic device to:

obtain first audio data, using the at least one microphone;

identify that a form of the electronic device is changed according to a linear movement corresponding to sliding of the second housing, using the at least one sensor, while the first audio data is obtained;

identify one of the plurality of pre-stored noise data as noise data based on the identifying that the form of the electronic device is changed; and obtain second audio data in which at least a portion of noise is reduced from the first audio data, based on the identified noise data.

* * * * *